United States Patent
Choi et al.

(10) Patent No.: US 10,609,377 B2
(45) Date of Patent: Mar. 31, 2020

(54) IMAGE ENCODING METHOD AND DEVICE FOR SAMPLE VALUE COMPENSATION AND IMAGE DECODING METHOD AND DEVICE FOR SAMPLE VALUE COMPENSATION

(71) Applicant: SAMSUNG ELECTRONICS CO., LTD., Suwon-si (KR)

(72) Inventors: Ki-ho Choi, Seoul (KR); Elena Alshina, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 206 days.

(21) Appl. No.: 15/572,614

(22) PCT Filed: Nov. 12, 2015

(86) PCT No.: PCT/KR2015/012185
§ 371 (c)(1),
(2) Date: Nov. 8, 2017

(87) PCT Pub. No.: WO2016/182152
PCT Pub. Date: Nov. 17, 2016

(65) Prior Publication Data
US 2018/0124408 A1    May 3, 2018

Related U.S. Application Data

(60) Provisional application No. 62/160,215, filed on May 12, 2015.

(51) Int. Cl.
*H04N 19/136* (2014.01)
*H04N 19/182* (2014.01)
(Continued)

(52) U.S. Cl.
CPC ......... *H04N 19/136* (2014.11); *H04N 19/117* (2014.11); *H04N 19/182* (2014.11); *H04N 19/82* (2014.11); *H04N 19/593* (2014.11)

(58) Field of Classification Search
CPC .. H04N 19/593; H04N 19/182; H04N 19/117; H04N 19/136; H04N 19/82
See application file for complete search history.

(56) References Cited

U.S. PATENT DOCUMENTS

| 9,426,483 B2 | 8/2016 | Alshina et al. |
| 2013/0114735 A1* | 5/2013 | Wang .................. H04N 19/176 375/240.23 |

(Continued)

FOREIGN PATENT DOCUMENTS

| CA | 2823902 A1 | 10/2012 |
| EP | 2 728 865 A2 | 5/2014 |

(Continued)

OTHER PUBLICATIONS

Communication issued by the European Patent Office dated Jan. 25, 2018 in counterpart European Patent Application No. 15891967.0.

(Continued)

*Primary Examiner* — Yon J Couso
(74) *Attorney, Agent, or Firm* — Sughrue Mion, PLLC

(57) ABSTRACT

The present disclosure provides an image encoding method and apparatus and an image decoding method and apparatus for generating a reconstructed image having a minimized error between an original image and the reconstructed image at a high bit depth and a high bit rate.

The image decoding method includes parsing offset values and an offset type from a bitstream; parsing a class based on the offset type from the bitstream; selecting a plurality of pixels from among pixels adjacent to a reconstructed pixel, based on the class, and calculating a reference value based on sample values of the plurality of pixels; determining a category based on a magnitude of a difference value between the reference value and a sample value of the reconstructed pixel; selecting an offset value from among the offset values, the offset value corresponding to the category; and compen- (Continued)

sating for the sample value of the reconstructed pixel by using the selected offset value.

19 Claims, 21 Drawing Sheets

(51) Int. Cl.
  *H04N 19/117* (2014.01)
  *H04N 19/82* (2014.01)
  *H04N 19/593* (2014.01)

(56) References Cited

U.S. PATENT DOCUMENTS

| | | | |
|---|---|---|---|
| 2013/0177067 A1 | 7/2013 | Minoo et al. | |
| 2013/0259118 A1* | 10/2013 | Fu | H04N 19/169 375/240.02 |
| 2014/0348222 A1 | 11/2014 | Hsiang et al. | |
| 2015/0146794 A1* | 5/2015 | Hoang | H04N 19/96 375/240.24 |
| 2015/0350650 A1* | 12/2015 | Kim | H04N 19/129 375/240.02 |

FOREIGN PATENT DOCUMENTS

| | | |
|---|---|---|
| KR | 1020130098481 A | 9/2013 |
| KR | 1020140075657 A | 6/2014 |
| WO | 2012126627 A1 | 9/2012 |
| WO | 2012/142966 A1 | 10/2012 |
| WO | 2013026174 A2 | 2/2013 |

OTHER PUBLICATIONS

Chih-Ming Fu et al., "CE8 Subtest3: Picture Quadtree Adaptive Offset", Joint Collaborative Team on Video Coding (JCT-VC) of ITU-T SG16 WP3 and ISO/IEC JTC1/SC29/WG11, 4th Meeting, Jan. 20-28, 2011: Daegu, Korea, Jan. 15, 2011, pp. 1-10 (total 10 pages), Document: JCTVC-D122, URL: http://wftp3.itu.int/av-arch/jctvc-site/, XP030008162.

Chih-Ming Fu et al. "Sample Adaptive Offset in the HEVC Standard" IEEE Transactions on Circuits and Systems for Video Technology, vol. 22, No. 12, Dec. 2012, (pp. 1755-1764).

International Search Report and Written Opinion (PCT/ISA/210 and PCT/ISA/237), dated Feb. 18, 2016 by International Searching Authority in International Application No. PCT/KR2015/012185.

Patrice Onno et al. "Modified Sample Adaptive Offset Filtering as an Inter-Layer Processing for Scalable HEVC" IEEE International Conference on Image Processing, Oct. 27-30, 2014, (pp. 3720-3723).

Communication dated Dec. 4, 2019, from the State Intellectual Property Office of People's Republic of China in counterpart Application No. 201580081456.8

* cited by examiner

FIG. 9A

| CATEGORY | CONDITIONS |
|---|---|
| 1 | $Xc < Xa$ && $Xc < Xb$ |
| 2 | $(Xc < Xa$ && $Xc == Xb) \| (Xc == Xa$ && $Xc < Xb)$ |
| 3 | $(Xc > Xa$ && $Xc == Xb) \| (Xc == Xa$ && $Xc > Xb)$ |
| 4 | $Xc > Xa$ && $Xc > Xb$ |
| 0 | WHEN CONDITIONS OF CATEGORIES 1, 2, 3, 4 ARE NOT SATISFIED |

FIG. 10

| CATEGORY | THRESHOLD |
|---|---|
| 1 | < −3.0 |
| 2 | −3.0 ~ −0.5 |
| 3 | −0.5 ~ 0.5 |
| 4 | 0.5 ~ 3.0 |
| 5 | > 3.0 |

CODING UNIT (2110)

IMAGE ENCODING METHOD AND DEVICE FOR SAMPLE VALUE COMPENSATION AND IMAGE DECODING METHOD AND DEVICE FOR SAMPLE VALUE COMPENSATION

TECHNICAL FIELD

The present disclosure relates to image encoding and decoding.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is coded according to a limited coding method based on a block having a predetermined size.

Through video encoding and decoding, a quality of a video may be distorted, and thus, in order to improve a quality of a reconstructed video, a post-processing module for the reconstructed video may be added to a decoding terminal.

DETAILED DESCRIPTION OF THE INVENTION

Technical Problem

The present disclosure provides an image encoding method and apparatus and an image decoding method and apparatus for generating a reconstructed image having a minimized error between an original image and the reconstructed image at a high bit depth and a high bit rate.

Technical Solution

According to an aspect of the present disclosure, there is provided an image decoding method including: parsing offset values and an offset type from a bitstream; parsing a class based on the offset type from the bitstream; selecting a plurality of pixels from among pixels adjacent to a reconstructed pixel, based on the class, and calculating a reference value based on sample values of the plurality of pixels; determining a category based on a magnitude of a difference value between the reference value and a sample value of the reconstructed pixel; selecting an offset value from among the offset values, the offset value corresponding to the category; and compensating for the sample value of the reconstructed pixel by using the selected offset value.

The calculating of the reference value may include calculating one of a median value and a mean value of the sample values of the plurality of pixels.

If the offset type is an edge type, the calculating of the reference value may include determining, based on the class, the reference value to be one of a median value and a mean value of the sample values of the plurality of pixels.

In the calculating of the reference value, if the offset type is a median value type, the reference value may correspond to a median value of the sample values of the plurality of pixels, and if the offset type is a mean value type, the reference value may correspond to a mean value of the sample values of the plurality of pixels.

The category may be one of a plurality of categories classified based on the magnitude of the difference value between the reference value and a sample value of a pixel.

In the determining of the category, if the difference value is less than a first threshold value, the category may be determined as a first category, if the difference value is equal to or greater than the first threshold value and is less than a second threshold value, the category may be determined as a second category, if the difference value is equal to or greater than the second threshold value and is less than a third threshold value, the category may be determined as a third category, if the difference value is equal to or greater than the third threshold value and is less than a fourth threshold value, the category may be determined as a fourth category, and if the difference value is equal to or greater than the fourth threshold value, the category may be determined as a fifth category, and wherein the plurality of categories may include the first through fifth categories.

The first threshold value and the second threshold value may be negative numbers, and the third threshold value and the fourth threshold value may be positive numbers.

If the category is determined as the third category, the sample value of the reconstructed pixel may not be compensated for.

The selecting of the offset value may include selecting an offset value that corresponds to one of the first through fifth categories and be from among the offset values.

In the parsing of the offset values and the offset type, the offset values and the offset type may be parsed according to each largest coding unit, and the each largest coding unit may include the reconstructed pixel.

Positions of the plurality of pixels may have directions.

The calculating of the reference value may include calculating the reference value by using the sample value of the reconstructed pixel and the sample values of the plurality of pixels.

The plurality of pixels may include the reconstructed pixel, and an upper left pixel, a left pixel, a right pixel, and a lower right pixel which are relative to the reconstructed pixel.

The plurality of pixels may include the reconstructed pixel, and a lower left pixel, a left pixel, a right pixel, and an upper right pixel which are relative to the reconstructed pixel.

The plurality of pixels may include the reconstructed pixel, and an upper left pixel, an upper pixel, a lower pixel, and a lower right pixel which are relative to the reconstructed pixel.

The plurality of pixels may include the reconstructed pixel, and a lower left pixel, a lower pixel, an upper pixel, and an upper right pixel which are relative to the reconstructed pixel.

The class may be one of a plurality of classes indicating combinations of the pixels adjacent to the reconstructed pixel.

According to another aspect of the present disclosure, there is provided a computer-readable recording medium having recorded thereon a program for implementing the image decoding method.

According to another aspect of the present disclosure, there is provided an image decoding apparatus including: an extractor configured to parse offset values and an offset type from a bitstream, and to parse a class based on the offset type from the bitstream; an offset determiner configured to select a plurality of pixels from among pixels adjacent to a reconstructed pixel, based on the class, to calculate a reference value based on sample values of the plurality of pixels, to determine a category based on a magnitude of a difference value between the reference value and a sample value of the reconstructed pixel, and to select an offset value from among the offset values, the offset value corresponding to the category; and a pixel compensator configured to compensate for the sample value of the reconstructed pixel by using the selected offset value.

According to another aspect of the present disclosure, there is provided an image encoding method including: selecting a plurality of pixels from among pixels adjacent to a reconstructed pixel, based on a class from among a plurality of classes according to an offset type, and calculating a reference value based on sample values of the plurality of pixels; determining a category based on a magnitude of a difference value between the reference value and a sample value of the reconstructed pixel; determining an offset value corresponding to the category, based on the sample value of the reconstructed pixel and a sample value of an original pixel of the reconstructed pixel; encoding the offset value, the offset type, and the class; and transmitting a bitstream comprising the encoded offset value, the encoded offset type, and the encoded class.

According to another aspect of the present disclosure, there is provided an image encoding apparatus including: an encoder configured to select a plurality of pixels from among pixels adjacent to a reconstructed pixel, based on a class from among a plurality of classes according to an offset type, to calculate a reference value based on sample values of the plurality of pixels, to determine a category based on a magnitude of a difference value between the reference value and a sample value of the reconstructed pixel, to determine an offset value corresponding to the category, based on the sample value of the reconstructed pixel and a sample value of an original pixel of the reconstructed pixel, and to encode the offset value, the offset type, and the class; and a transmitter configured to transmit a bitstream comprising the encoded offset value, the encoded offset type, and the encoded class.

DESCRIPTION OF THE DRAWINGS

FIGS. 9A and 9B illustrate categories of an edge type, according to an embodiment of the present disclosure.

FIG. 10 illustrates categories of an edge type, a mean value type, and a median value type, according to an embodiment of the present disclosure.

MODE OF THE INVENTION

Hereinafter, with reference to FIGS. 1 through 24, various embodiments of an image encoding method and apparatus and an image decoding method and apparatus for compensating for a sample value of a predetermined pixel will now be described below. In more detail, with reference to FIGS. 1 through 11, various embodiments of image encoding and decoding for compensation of a sample value of a predetermined pixel will be provided, and with reference to FIGS. 1 through 24, an embodiment of compensating for a sample value of a predetermined pixel in a coding unit of a tree structure according to an embodiment of the present disclosure will be provided. Hereinafter, an 'image' may indicate a still image of a video or a moving picture, i.e., the video itself.

Hereinafter, with reference to FIGS. 1 through 11, image encoding and decoding for compensation of a sample value of a predetermined pixel according to an embodiment of the present disclosure will now be described.

Figure 1:
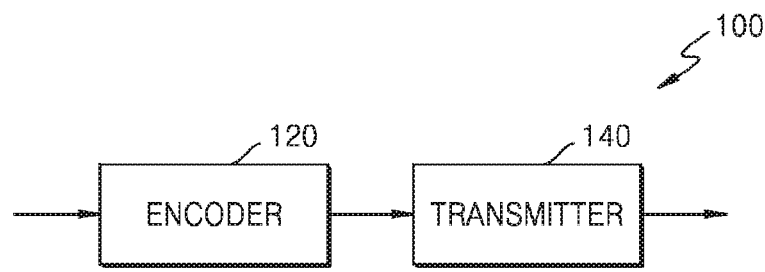
FIG. 1 is a block diagram of a video encoding apparatus 100, according to an embodiment of the present disclosure.

FIG. 1 is a block diagram of a video encoding apparatus 100, according to an embodiment of the present disclosure.

The video encoding apparatus 100 according to an embodiment includes an encoder 120 and a transmitter 140. The encoder 120 according to an embodiment selects a plurality of pixels from among pixels adjacent to a reconstructed pixel, based on a class from among a plurality of classes according to an offset type. In addition, the encoder 120 calculates a reference value based on sample values of the plurality of pixels. The encoder 120 determines a category based on a magnitude of a difference value between the reference value and a sample value of the reconstructed pixel. In addition, the encoder 120 determines an offset value corresponding to the category, based on the sample value of the reconstructed pixel and a sample value of an original pixel of the reconstructed pixel. In addition, the encoder 120 encodes the offset value, the offset type, and the class.

The transmitter 140 transmits a bitstream including the encoded offset value, the encoded offset type, and the encoded class. A video decoding apparatus may receive the bitstream transmitted from the transmitter 140.

The video encoding apparatus 100 according to an embodiment may determine the offset type, based on a classification method with respect to sample values of a current block. For example, the video encoding apparatus 100 may determine the offset type of the current block, based on a spatial characteristic of the sample values of the current block.

The offset type according to an embodiment may be determined to be an edge type, a band type, a mean value type, or a median value type. Based on the classification method with respect to the sample values of the current block, the video encoding apparatus 100 may determine which type is appropriate in classifying pixels of the current block.

In more detail, the video encoding apparatus 100 may select one of the edge type, the band type, the mean value type, the median value type, and a case of not using a sample-adaptive offset (SAO), based on Rate-Distortion Optimization (RDO). For example, the video encoding apparatus 100 may perform encoding with respect all of the aforementioned cases, and may calculate Rate-Distortion (RD) values of the cases, respectively. In addition, the video encoding apparatus 100 may select a type of a case having a best RD value.

Each of the cases may include a plurality of cases. For example, the edge type may have 4 classes. For example, the mean value type may have 10 types. The classes of the edge type may each indicate a direction of an edge of the reconstructed pixel with respect to neighboring pixels. The video encoding apparatus 100 may select one of classes included in a selected type. For example, the video encoding apparatus 100 may perform encoding with respect all of the aforementioned cases, and then may calculate the RD values of the cases, respectively. In addition, the video encoding apparatus 100 may select the case having a best RD value.

In the above descriptions, for convenience of description, a type and a class are separately described. However, the video encoding apparatus 100 may perform encoding with respect to each of classes included in each of the types, and then may calculate an RD value of each case. The video encoding apparatus 100 may select a type and class of a case with a best RD value.

In a case where the offset type according to an embodiment is the edge type, offsets between reconstructed pixels and original pixels may be determined based on directions and edge shapes formed with neighboring pixels by the reconstructed pixels of the current block.

In a case where the offset type according to an embodiment is the band type, offsets of reconstructed pixels in some bands among a plurality of bands obtained by dividing a range of sample values of the reconstructed pixels of the current block. According to cases, the bands may divide the range of the sample values at equal intervals or at unequal intervals. The range of the sample values may be determined based on a bit depth.

In a case where the offset type according to an embodiment is the mean value type, the video encoding apparatus 100 may select a plurality of pixels adjacent to a reconstructed pixel, based on the class. The class may be one of the plurality of classes. In addition, the video encoding apparatus 100 may calculate, as a reference value, a mean value of sample values of the plurality of pixels. The video encoding apparatus 100 may determine an offset value based on the reference value.

In a case where the offset type according to an embodiment is the median value type, the video encoding apparatus 100 may select a plurality of pixels adjacent to a reconstructed pixel, based on the class. The class may be one of the plurality of classes. In addition, the video encoding apparatus 100 may calculate, as a reference value, a median value of sample values of the plurality of pixels. The video encoding apparatus 100 may determine an offset value based on the reference value.

As described above, when the offset type is the median value type, a reference value may be a median value of the sample values of the plurality of pixels, and when the offset type is the mean value type, a reference value may be a mean value of the sample values of the plurality of pixels.

The encoder 120 according to an embodiment may determine an offset class for each of reconstructed pixels, according to the offset type of the current block.

In a case where the offset type according to an embodiment is the edge type, the class may indicate a direction of an edge of the reconstructed pixel with respect to neighboring pixels. The class according to an embodiment may indicate the direction of the edge with 0 degree, 90 degrees, 45 degrees, or 135 degrees. The direction of the edge is not limited thereto and various directions may be present. In addition, the class may not indicate the direction. This will be described in detail with reference to FIG. 8A and FIG. 8B.

In a case where the offset type according to an embodiment is the band type, a band class according to an embodiment may indicate a band position indicating a band including sample values of the reconstructed pixel, when a range of sample values of the current block is divided into a predetermined number of consecutive sample value groups, and each of the sample value groups is referred to as a band.

For example, in a case of a pixel of which sample value is 8 bits, a range of the sample values is between 0 and 255, and the sample values may be divided into a total of 32 bands. In this case, a predetermined number of bands including sample values of the reconstructed pixels may be determined from among the 32 bands. The band class according to an embodiment may indicate a start position of a predetermined number of consecutive bands, and a position of a start band may be expressed with band indexes of 0 through 31.

When the offset type according to an embodiment is the mean value type or the median value type, the class according to an embodiment may indicate a direction of the reconstructed pixel with respect to neighboring pixels. The class according to an embodiment may indicate the direction of 0 degree, 90 degrees, 45 degrees, or 135 degrees. However, the direction is not limited thereto and thus may vary.

The class may not indicate the direction. For example, when the offset type is the mean value type or the median value type, the class may be one of the plurality of classes, the class selecting all pixels adjacent to at least one reconstructed pixel. This will be described in detail with reference to FIGS. 8A-8J. A relation between the offset type and the class will be described in detail with reference to FIGS. 6A-6C. In addition, the class will be described in detail with reference to FIGS. 7 and 8.

A category of the reconstructed pixels of the current block may be determined based on a method below.

In a case of the edge type, the reconstructed pixels of the current block may be classified into a predetermined number of categories according to edge shapes formed with neighboring pixels by the reconstructed pixels. For example, the reconstructed pixels may be classified into 4 categories according to 4 edge shapes of a local valley of a concave edge, a curved corner of the concave edge, a curved corner of a convex edge, and a local peak of the convex edge. According to a shape of an edge of each of the reconstructed pixels of the current block, one reconstructed pixel may be determined to be included in one of the 4 categories. However, it is not limited thereto. For example, the video encoding apparatus 100 may determine a category in a same manner as a case of the mean value type or the median value type.

In a case of the band type, the reconstructed pixels of the current block may be classified into a predetermined number of categories according to band positions including sample values of the reconstructed pixels. For example, the reconstructed pixels may be classified into 4 categories according to band indexes of 4 consecutive bands from a start position of a band indicated by a band class. Each of the reconstructed pixels of the current block may be determined to be included in one of the 4 categories according to which band among the 4 bands it belongs.

In a case of the mean value type or the median value type, the video encoding apparatus 100 may determine a category, based on a magnitude of a difference value between the reference value and a sample value of a reconstructed value. For example, the reconstructed value may be determined to be included in one of 5 categories according to the magnitude of the difference value. A method of determining a category will be described in detail with reference to FIGS. 9A, 9B, and 10.

When the category is determined, the video encoding apparatus 100 may determine an offset value corresponding to the category, based on a sample value of the reconstructed pixel and a sample value of an original pixel. For example, the video encoding apparatus 100 may determine a difference between the sample value of the reconstructed pixel and the sample value of the original pixel to be offset value. As described above, the video encoding apparatus 100 may calculate an offset value of each type and each class. The video encoding apparatus 100 may calculate an RD value of each case. The video encoding apparatus 100 may select an offset value of a case having a best RD value, and may encode and transmit the selected offset value to a video decoding apparatus 300.

As described above, the video encoding apparatus 100 may classify the plurality of reconstructed pixels into a plurality of categories. In addition, the video encoding apparatus 100 may determine an offset value for each of the categories. That is, the video encoding apparatus 100 may determine a plurality of offset values corresponding to the plurality of categories.

Figure 2:
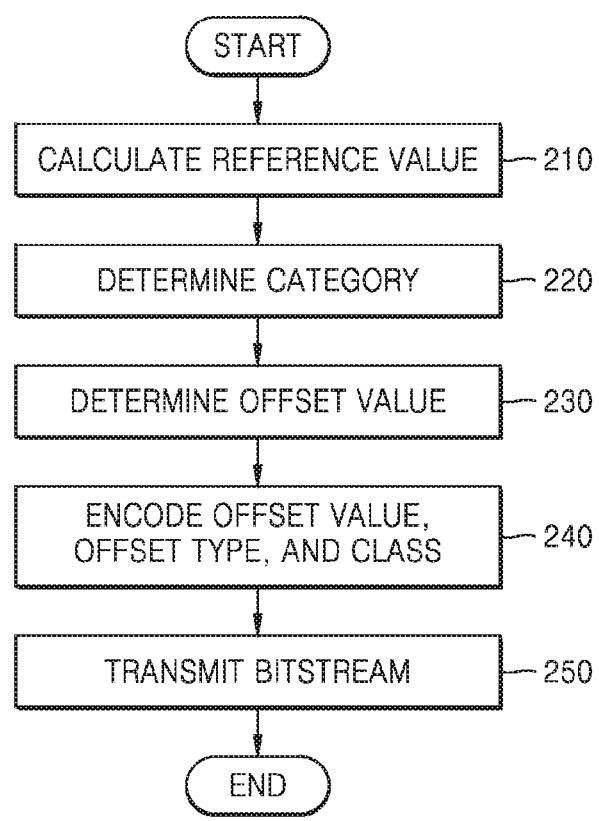
FIG. 2 is a flowchart of an image encoding method, according to an embodiment of the present disclosure.

FIG. 2 is a flowchart of an image encoding method, according to an embodiment of the present disclosure.

Descriptions of the image encoding method of FIG. 2 which are repeated in the descriptions with reference to FIG. 1 are omitted here. Operations 210, 220, 230, and 240 of the image encoding method according to an embodiment of the present disclosure may be performed by the encoder 120 of FIG. 1. In addition, operation 250 of the image encoding method according to an embodiment of the present disclosure may be performed by the transmitter 140.

The image encoding method according to an embodiment includes operation 210 of selecting a plurality of pixels from among pixels adjacent to a reconstructed pixel, based on a class from among a plurality of classes according to an offset type, and calculating a reference value based on sample values of the plurality of pixels. In addition, the image encoding method includes operation 220 of determining a category based on a magnitude of a difference value between the reference value and a sample value of the reconstructed pixel. In addition, the image encoding method includes operation 230 of determining an offset value corresponding to the category, based on the sample value of the reconstructed pixel and a sample value of an original pixel of the reconstructed pixel. In addition, the image encoding method includes operation 240 of encoding the offset value, the offset type, and the class. In addition, the image encoding method includes operation 250 of transmitting a bitstream including the encoded offset value, the encoded offset type, and the encoded class.

Figure 3:
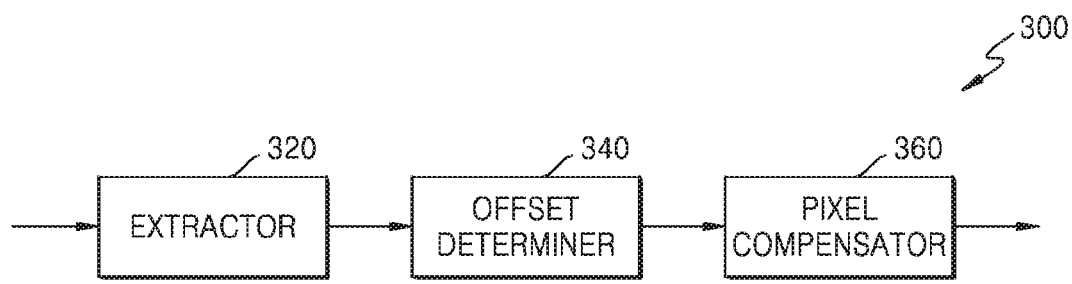
FIG. 3 is a block diagram of a video decoding apparatus, according to an embodiment of the present disclosure.

FIG. 3 is a block diagram of the video decoding apparatus, according to an embodiment of the present disclosure.

The video decoding apparatus 300 may include an extractor 320, an offset determiner 340, and a pixel compensator 360.

The extractor 320 may parse offset values and an offset type from a bitstream, and may parse a class based on the offset type from the bitstream. The offset determiner 340 may select a plurality of pixels from among pixels adjacent to a reconstructed pixel, based on the class. The offset determiner 340 may calculate a reference value based on sample values of the plurality of pixels. The offset determiner 340 may determine a category based on a magnitude of a difference value between the reference value and a sample value of the reconstructed pixel. The offset determiner 340 may select an offset value from among the offset values, the offset value corresponding to the category. The pixel compensator 360 may include a pixel compensator to compensate for the sample value of the reconstructed pixel by using the selected offset value. Further details will be described with reference to an image decoding method of FIG. 4.

Figure 4:
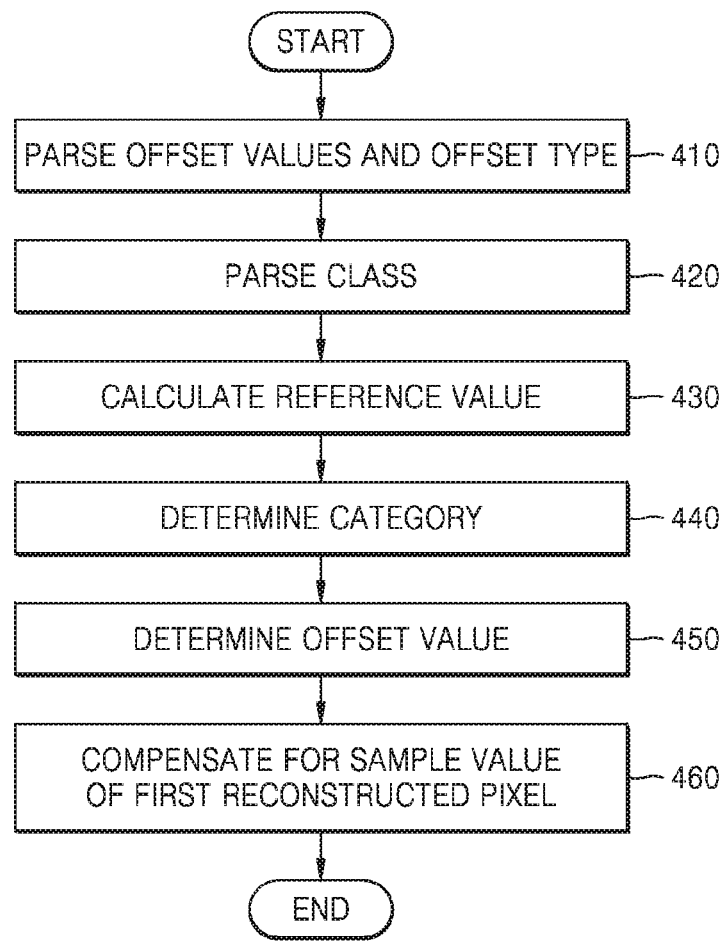
FIG. 4 is a flowchart of an image decoding method, according to an embodiment of the present disclosure.

FIG. 4 is a flowchart of an image decoding method, according to an embodiment of the present disclosure.

Operation 410 of the image decoding method according to an embodiment of the present disclosure may be performed by the extractor 320 of the video decoding apparatus 300. Operations 420, 430, 440, and 450 of the image decoding method according to an embodiment of the present disclosure may be performed by the offset determiner 340 of the video decoding apparatus 300. Operation 460 of the image decoding method according to an embodiment of the present disclosure may be performed by the pixel compensator 360 of the video decoding apparatus 300.

The image decoding method according to an embodiment of the present disclosure includes operation 410 of parsing offset values and an offset type from a bitstream. The video decoding apparatus 300 may receive the bitstream from the transmitter 140 of FIG. 1. In addition, the image decoding method according to an embodiment of the present disclosure includes operation 420 of parsing a class based on the offset type from the bitstream. The image decoding method according to an embodiment of the present disclosure includes operation 430 of selecting a plurality of pixels from among pixels adjacent to a reconstructed pixel, based on the class, and calculating a reference value based on sample values of the plurality of pixels. The image decoding method according to an embodiment of the present disclosure includes operation 440 of determining a category based on a magnitude of a difference value between the reference value and a sample value of the reconstructed pixel. The image decoding method according to an embodiment of the present disclosure includes operation 450 of selecting an offset value from among the offset values, the offset value corresponding to the category. The image decoding method according to an embodiment of the present disclosure includes operation 460 of compensating for the sample value of the reconstructed pixel by using the selected offset value.

Operation 430 of calculating the reference value may be operation of calculating one of a median value and a mean value of the sample values of the plurality of pixels selected from among the pixels adjacent to the reconstructed pixel.

In addition, operation 430 of calculating the reference value may include determining the reference value to be one of the median value and the mean value of the sample values of the plurality of pixels, based on the class, when the offset type is an edge type.

In operation 430 of calculating the reference value, when the offset type is a median value type, the reference value may be the median value of the sample values of the plurality of pixels. In addition, in operation 430 of calculating the reference value, when the offset type is a mean value type, the reference value may be the mean value of the sample values of the plurality of pixels.

The category may be one of a plurality of categories divided according to a magnitude of a difference value between the reference value and a sample value of the reconstructed pixel.

In operation 440 of determining the category, if the difference value is less than a first threshold value, the category may be determined to be a first category. In operation 440 of determining the category, if the difference value is equal to or greater than the first threshold value and is less than a second threshold value, the category may be determined to be a second category. In operation 440 of determining the category, if the difference value is equal to or greater than the second threshold value and is less than a third threshold value, the category may be determined to be a third category. In operation 440 of determining the category, if the difference value is equal to or greater than the third threshold value and is less than a fourth threshold value, the category may be determined to be a fourth category. In operation 440 of determining the category, if the difference value is equal to or greater than the fourth threshold value, the category may be determined to be a fifth category. The plurality of categories may include the first through fifth categories.

In addition, the aforementioned first threshold value and second threshold value may be negative numbers, and the third threshold value and fourth threshold value may be positive numbers.

When the category is determined to be the third category, the sample value of the reconstructed pixel may not be compensated for.

Operation 450 of selecting the offset value may include selecting the offset value from among the offset values, the offset value corresponding to one of the first through fifth categories.

In operation 410 of parsing the offset values and the offset type, the offset values and the offset type may be parsed with respect to each of largest coding units. The largest coding unit may include the reconstructed pixel.

Positions of the plurality of pixels may have directions.

In operation 430 of calculating the reference value, the calculation may be performed by using the sample value of the reconstructed pixel and the sample values of the plurality of pixels.

The plurality of pixels selected by the video decoding apparatus 300 may include a reconstructed pixel, and an upper left pixel, a left pixel, a right pixel, and a lower right pixel which are relative to the reconstructed pixel.

The plurality of pixels selected by the video decoding apparatus 300 may include a reconstructed pixel, and a lower left pixel, a left pixel, a right pixel, and an upper right pixel which are relative to the reconstructed pixel.

The plurality of pixels selected by the video decoding apparatus 300 may include a reconstructed pixel, and an upper left pixel, an upper pixel, a lower pixel, and a lower right pixel which are relative to the reconstructed pixel.

The plurality of pixels selected by the video decoding apparatus 300 may include a reconstructed pixel, and a lower left pixel, a lower pixel, an upper pixel, and an upper right pixel which are relative to the reconstructed pixel.

The class may be one of a plurality of classes indicating combinations of pixels adjacent to the reconstructed pixel.

Hereinafter, with reference to FIG. 5, an image decoding method using an SAO technique will now be described.

Figure 5:
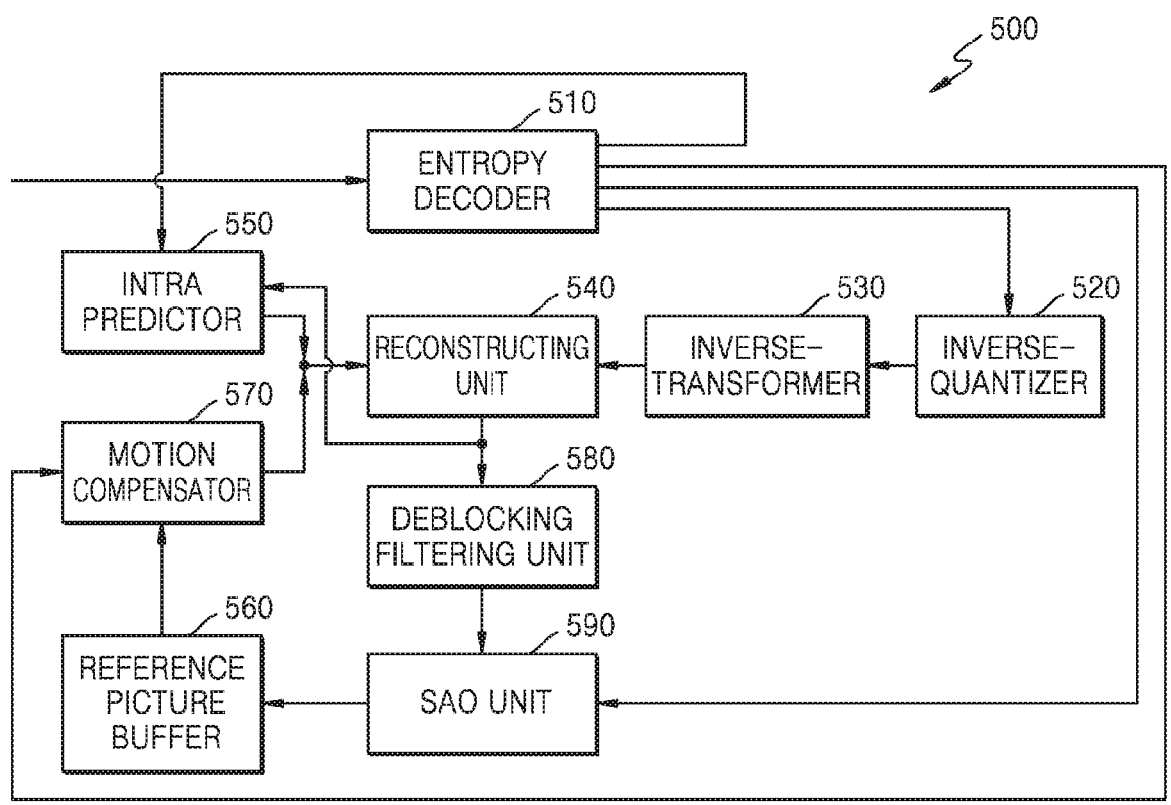
FIG. 5 is a block diagram of a video decoding apparatus 500, according to another embodiment of the present disclosure.

FIG. 5 is a block diagram of a video decoding apparatus 500, according to another embodiment of the present disclosure.

The video decoding apparatus 500 includes an entropy decoder 510, an inverse-quantizer 520, an inverse-transformer 530, a reconstructing unit 540, an intra predictor 550, a reference picture buffer 560, a motion compensator 570, a deblocking filtering unit 580, and an SAO unit 590.

The video decoding apparatus 500 may receive a bitstream including encoded video data. The entropy decoder 510 may parse, from the bitstream, intra mode information, inter mode information, sample adaptive offset (SAO) information, and residual data (residues).

The residual data extracted by the entropy decoder 510 may be quantized transform coefficients. Thus, the inverse-quantizer 520 may perform inverse-quantization on the residual data, thereby reconstructing transform coefficients, and the inverse-transformer 530 may perform inverse-transform on the reconstructed transform coefficients, thereby reconstructing residual values of a spatial domain.

In order to prediction-reconstruct the residual values of the spatial domain, intra prediction or motion compensation may be performed.

When the intra mode information is extracted by the entropy decoder 510, the intra predictor 550 may determine which samples from among neighboring samples are referred to in reconstructing a current sample by using the intra mode information, wherein the samples are spatially adjacent to the current sample. The reference-target neighboring samples may be selected from among samples that were reconstructed by the reconstructing unit 540. The reconstructing unit 540 may reconstruct current samples by using the reference samples determined based on the intra mode information, and the residual values reconstructed by the inverse-transformer 530.

When the inter mode information is extracted by the entropy decoder 510, the motion compensator 570 may determine which samples are referred to in reconstructing a current sample of a current picture by using the inter mode information, the samples are from among pictures that were reconstructed before the current picture. The inter mode information may include a motion vector, a reference index, or the like. A reference picture for motion compensation with respect to the current sample may be determined by using the reference index, the reference picture being from among pictures that were reconstructed before the current picture and are stored in the reference picture buffer 560. A reference block for motion compensation with respect to a current block may be determined by using the motion vector, wherein the current block is of the reference picture. The reconstructing unit 540 may reconstruct the current samples by using the reference block determined based on the inter mode information, and the residual values reconstructed by the inverse-transformer 530.

The samples may be reconstructed by the reconstructing unit 540 so that reconstructed pixels may be output. The reconstructing unit 540 may generate the reconstructed pixels based on coding units of a tree structure according to each of largest coding units.

The deblocking filtering unit 580 may perform filtering on a largest coding unit or a coding unit of a tree structure so as to reduce blocking occurrence with respect to pixels positioned at a boundary of the coding unit.

The SAO unit 590 according to an embodiment may adjust an offset of the reconstructed pixels according to each of the largest coding unit, by using an SAO technique. The SAO unit 590 may determine an offset type, an offset class, and offset values for a current largest coding unit from the SAO information extracted by the entropy decoder 510.

An extracting operation by the entropy decoder 510 with respect to the SAO information may correspond to an operation by the extractor 320 of the video decoding apparatus 300, and operations by the SAO unit 590 may correspond to operations by the offset determiner 340 and the pixel compensator 360 of the video decoding apparatus 300.

The SAO unit 590 may determine a sign and a difference value of an offset value for each of reconstructed pixels of the current largest coding unit. The SAO unit 590 may increase or decrease a sample value of each of the reconstructed pixels by the difference value determined from the offset value, thereby decreasing an error between the reconstructed pixels and original pixels.

A picture including the reconstructed pixels of which offset is adjusted by the SAO unit 590 may be stored in the reference picture buffer 560. Thus, motion compensation with respect to a next picture may be performed by using a reference picture in which the error between the reconstructed pixels and the original pixels is minimized by using the SAO technique.

According to the SAO technique according to an embodiment, an offset of a pixel group including reconstructed pixels may be determined. First, embodiments in which reconstructed pixels are classified into pixel groups for the SAO technique will now be described in detail.

According to the SAO technique according to an embodiment, (i) pixels may be classified according to an edge type of the reconstructed pixels or (ii) the pixels may be classified according to a band type of the reconstructed pixels. In addition, (iii) the pixels may be classified according to a mean value type or (iv) the pixels may be classified according to a median value type. Whether the pixels are classified according to the edge type, the band type, the mean value type, or the median value type may be defined by an offset type.

Hereinafter, FIGS. 6A through 11 will now be described based on the video encoding apparatus 100 of FIG. 1, the image encoding method of FIG. 2, the video decoding apparatus 300 of FIG. 3, and the image decoding method of FIG. 4.

Figure 6A:
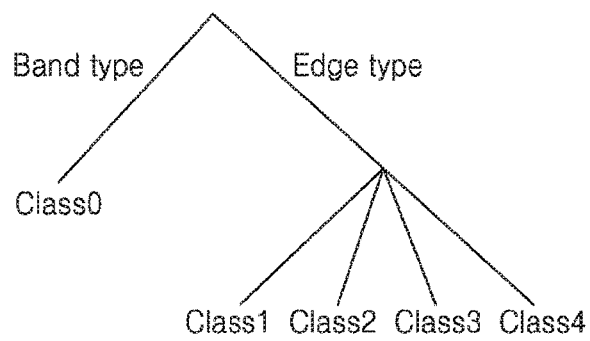
FIGS. 6A-6C illustrate an offset type and a class, according to an embodiment of the present disclosure.

Referring to FIG. 6A, an offset type may have a band type and an edge type.

Figure 6B:
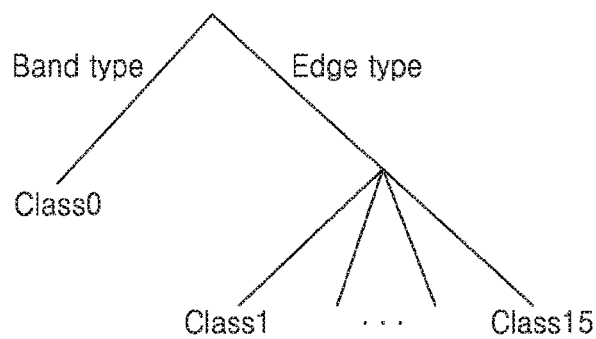
Figure 6C:
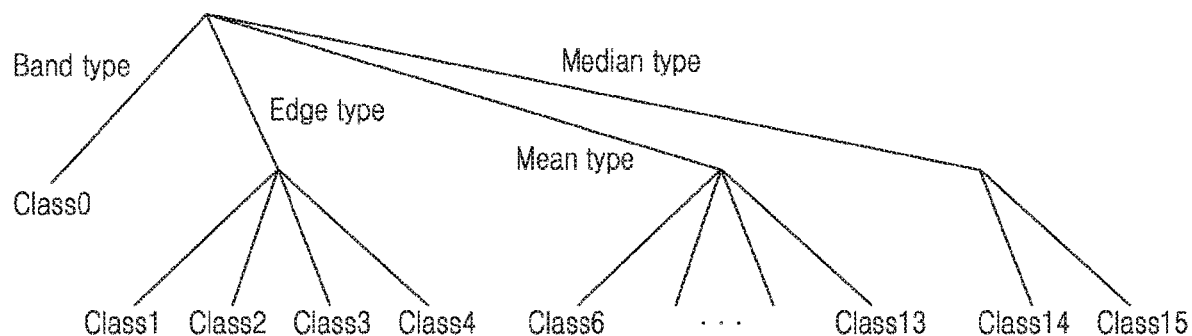

FIGS. 6A-6C illustrate an offset type and a class, according to an embodiment of the present disclosure.

In a case of the band type, the video encoding apparatus 100 may not separately transmit class information to the video decoding apparatus 300. In addition, the video encoding apparatus 100 may transmit start position information of a band to the video decoding apparatus 300. The edge type may include 4 classes (class1 through class 4). For example, a class of the edge type may indicate a direction of an edge of a reconstructed pixel with respect to neighboring pixels. The class of the edge type according to an embodiment may indicate one edge direction of 0°, 90°, 45°, and 135°.

The video encoding apparatus 100 may include an offset type of a current block and a class according to the offset type in a bitstream and may transmit the bitstream. The video encoding apparatus 100 may allocate an index to the offset type or the class. When an occurrence frequency of the offset type or the class is high, the video encoding apparatus 100 may allocate a small index to the offset type or the class.

The video decoding apparatus 300 may parse the offset type and the class from the bitstream transmitted from the video encoding apparatus 100. For example, when the offset type of a current block which is parsed by the video decoding apparatus 300 is an edge type, the video decoding apparatus 300 may parse at least one of class1 through class 4.

In a case of the class of the edge type, reconstructed pixels of the current block may be classified into a predetermined number of categories according to edge shapes formed with neighboring pixels by the reconstructed pixels. For example, the reconstructed pixels may be classified into 4 categories according to 4 edge shapes of a local valley of a concave edge, a curved corner of the concave edge, a curved corner of a convex edge, and a local peak of the convex edge. The 4 categories will be described in detail with reference to FIG. 9B.

Referring to FIG. 6B, the offset type may have the band type and the edge type. Because the band type is described with reference to FIG. 1 and FIG. 6A, detailed descriptions thereof are omitted. The edge type may have 5 or more classes. For example, the edge type may include 15 classes (class1 through class15). The 15 classes may include the 4 classes (class1 through class 4) of FIG. 6A.

The video encoding apparatus 100 may include an offset type of the current block and a class according to the offset type in a bitstream and may transmit the bitstream. The video decoding apparatus 300 may parse the offset type and the class from the bitstream transmitted from the video encoding apparatus 100. For example, when the offset type of the current block which is parsed by the video decoding apparatus 300 is an edge type, the video decoding apparatus 300 may parse at least one of class1 through class 15.

As in FIG. 6A, when the parsed class is class1 through class4 of FIG. 6B, reconstructed pixels of the current block may be classified into a predetermined number of categories according to edge shapes formed with neighboring pixels by the reconstructed pixels. For example, the reconstructed pixels may be classified into 4 categories according to 4 edge shapes of a local valley of a concave edge, a curved corner of the concave edge, a curved corner of a convex edge, and a local peak of the convex edge.

When the parsed class is class5 through class15 of FIG. 6B, the video decoding apparatus 300 may select a plurality of pixels from among pixels adjacent to a reconstructed pixel, based on a class. The video decoding apparatus 300 may calculate a reference value based on sample values of the plurality of pixels.

When the offset type is the edge type, the video decoding apparatus 300 may determine, as the reference value, one of a median value and a mean value of the sample values of the plurality of pixels adjacent to the reconstructed pixel. For example, the video decoding apparatus 300 may determine the median value or the mean value to be the reference value, based on the class. That is, with respect to class 5 through class 10, the video encoding apparatus 100 and the video decoding apparatus 300 may determine the reference value by using the mean value. With respect to class 11 through class 15, the video encoding apparatus 100 and the video decoding apparatus 300 may determine the reference value by using the median value. However, it is not limited thereto.

The video decoding apparatus 300 may determine a category based on a magnitude of a difference value between the reference value and a sample value of the reconstructed pixel. A method of determining a category in a case of class 5 through class 15 will be described in detail with reference to FIG. 10.

Referring to FIG. 6C, the offset type may have the band type, the edge type, a mean value type, or a median value type. Because the band type is described with reference to FIG. 1 and FIG. 6A, detailed descriptions thereof are omitted. The edge type may include classes (class1 through class4). The classes included in the edge type may be equal to the 4 classes (class1 through class4) of FIG. 6A.

The mean value type and the median value type may each include one or more classes. For example, the mean value type may have 7 classes (class 6 through class 13). The median value type may have 2 classes (class 14 and class 15.

The video encoding apparatus 100 may include an offset type of a current block and a class according to the offset type in a bitstream and may transmit the bitstream. The video decoding apparatus 300 may parse the offset type and the class from the bitstream transmitted from the video encoding apparatus 100. For example, when the offset type of the current block which is parsed by the video decoding apparatus 300 is an edge type, the video decoding apparatus 300 may parse at least one of class1 through class4. When the offset type of the current block which is parsed by the video decoding apparatus 300 is a mean value type, the video decoding apparatus 300 may parse a class with respect to the current block. For example, the parsed class may be at least one of class5 through class13. When the offset type of the current block which is parsed by the video decoding apparatus 300 is a median value type, the video decoding apparatus 300 may parse at least one of class14 through class15 as the class with respect to the current block.

As in FIG. 6A, when the parsed class is class 1 through class 4 of FIG. 6C, reconstructed pixels of the current block may be classified into a predetermined number of categories according to edge shapes formed with neighboring pixels by the reconstructed pixels. For example, the reconstructed pixels may be classified into 4 categories according to 4 edge shapes of a local valley of a concave edge, a curved corner of the concave edge, a curved corner of a convex edge, and a local peak of the convex edge.

When the parsed class is class5 through class13 of FIG. 6C, the video decoding apparatus 300 may select a plurality of pixels from among pixels adjacent to a reconstructed pixel, based on a class. The video decoding apparatus 300 may calculate a reference value based on sample values of the plurality of pixels. The reference value may be a mean value of the plurality of pixels. The video decoding apparatus 300 may determine a category based on a magnitude of a difference value between the reference value and a sample value of the reconstructed pixel.

When the parsed class is class14 through class15 of FIG. 6C, the video decoding apparatus 300 may select a plurality of pixels from among pixels adjacent to a reconstructed pixel, based on a class. The video decoding apparatus 300 may calculate a reference value based on sample values of the plurality of pixels. The reference value may be a median value of the plurality of selected pixels. The video decoding apparatus 300 may determine a category based on a magnitude of a difference value between the reference value and a sample value of the reconstructed pixel. A method of determining a category in a case of class 5 through class 15 will be described in detail with reference to FIG. 10.

Figure 7:
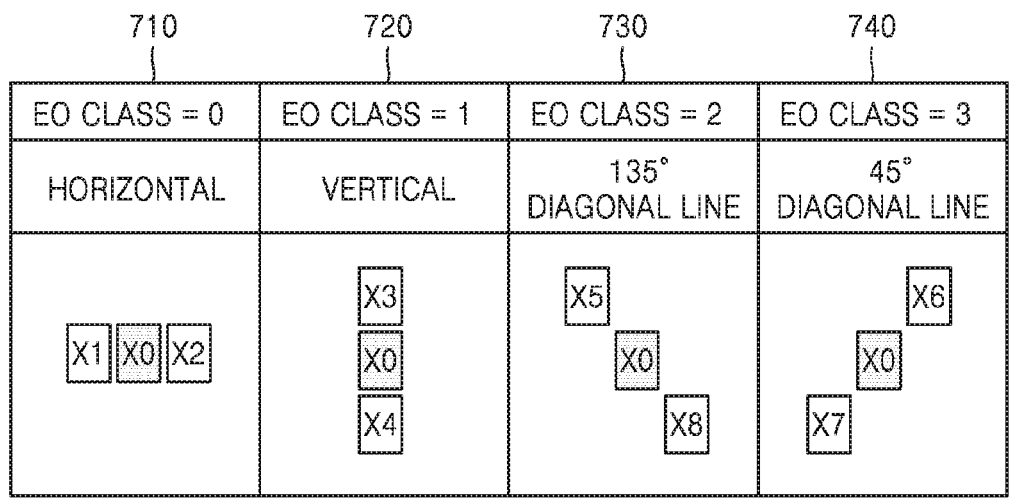
FIG. 7 illustrates a class, according to an embodiment of the present disclosure.

FIG. 7 illustrates a class, according to an embodiment of the present disclosure.

The class may be one of a plurality of classes 710, 720, 730, and 740 indicating combinations of pixels adjacent to a reconstructed pixel X0. The video decoding apparatus 300 may sequentially allocate 0, 1, 2, and 3 to indexes of the classes 710, 720, 730, and 740. For example, the video decoding apparatus 300 may allocate a small index when an occurrence frequency of the class is high. Each of an edge type, a mean value type, and a median value type may include the classes 710, 720, 730, and 740.

The class may indicate a direction of a one-dimensional edge formed between the current reconstructed pixel X0 and two neighboring pixels adjacent thereto. That is, positions of a plurality of pixels selected based on the class by the video decoding apparatus 300 may have a direction.

The class 710 of an index 0 indicates a case in which the current reconstructed pixel X0 and two neighboring pixels X1 and X2 that are horizontally adjacent to the current reconstructed pixel X0 form an edge. That is, the class 710 may indicate an edge direction of 0 degree. The class 720 of an index 1 indicates a case in which the current reconstructed pixel X0 and two neighboring pixels X3 and X4 that are vertically adjacent to the current reconstructed pixel X0 form an edge. That is, the class 720 may indicate an edge direction of 90 degrees. The class 730 of an index 2 indicates a case in which the current reconstructed pixel X0 and two neighboring pixels X5 and X8 that are adjacent to the current reconstructed pixel X0 in a diagonal direction of 135 degrees form an edge. The class 740 of an index 3 indicates a case in which the current reconstructed pixel X0 and two neighboring pixels X6 and X7 that are adjacent to the current reconstructed pixel X0 in a diagonal direction of 45 degrees form an edge.

FIGS. 8A-8J illustrate a class, according to an embodiment of the present disclosure.

The class may be one of a plurality of classes 810, 815, 820, 825, 830, 835, 840, 850, 860, and 870 indicating combinations of pixels adjacent to reconstructed pixels 811, 816, 822, 827, 832, 837, 843, 853, 863, and 873.

The video decoding apparatus 300 may sequentially allocate 0, 1, 2, 3, 4, 5, 6, 7, and 8 to indexes of the classes 810, 815, 820, 825, 830, 835, 840, 850, 860, and 870. For example, the video decoding apparatus 300 may allocate a small index to a class when an occurrence frequency of the class is high. Each of an edge type, a mean value type, and a median value type may include the classes 810, 815, 820, 825, 830, 835, 840, 850, 860, and 870.

The class may not indicate a direction. For example, FIG. 8A indicates the class 810 of an index 0. A coding unit may include the reconstructed pixel 811. The video decoding apparatus 300 may select a plurality of pixels, based on the class 810. The plurality of pixels may include all reconstructed pixels adjacent to the current reconstructed pixel 811, and the current reconstructed pixel 811.

Figure 8A:
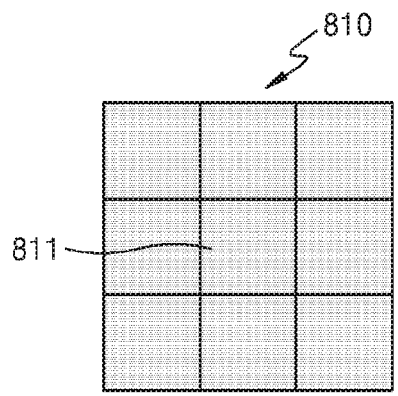
FIGS. 8A-8J illustrate a class, according to an embodiment of the present disclosure.
Figure 8B:
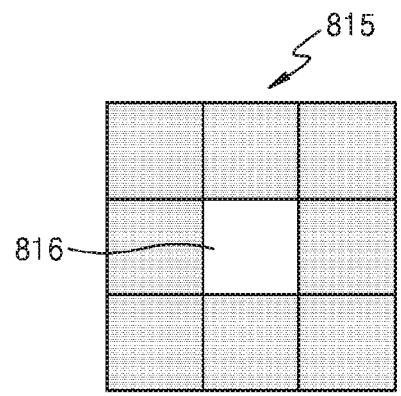
Figure 8C:
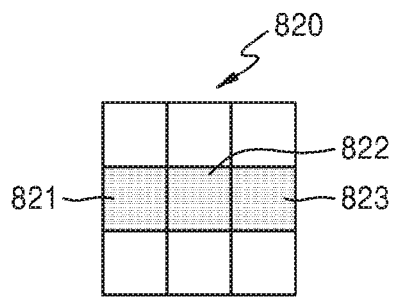

FIG. 8B may indicate the class 815 of an index 1. The coding unit may include the reconstructed pixel 816. The video decoding apparatus 300 may select a plurality of pixels, based on the class 815. The plurality of pixels may include all reconstructed pixels adjacent to the current reconstructed pixel 816. However, unlike to a case of the class 810 in FIG. 8A, the video decoding apparatus 300 may not select the current reconstructed pixel 816.

The class may indicate a direction. That is, positions of a plurality of pixels selected based on the class by the video decoding apparatus 300 may have directions. For example, FIG. 8C indicates the class 820 of an index 2. The class 820 of an index 2 may indicate a horizontal direction. For example, the video decoding apparatus 300 may select a plurality of pixels, based on the class 820. The plurality of pixels may include the current reconstructed pixel 822, a neighboring pixel 821, and a neighboring pixel 823. The class 820 may be a class having a same shape as the class 710 of FIG. 7.

Figure 8D:
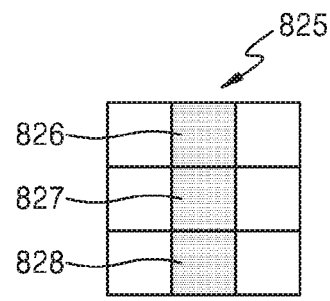

FIG. 8D indicates the class 825 of an index 3. The class 825 of an index 3 may indicate a vertical direction. For example, the video decoding apparatus 300 may select a plurality of pixels, based on the class 825. The plurality of pixels may include the current reconstructed pixel 827, a neighboring pixel 826, and a neighboring pixel 828. The class 825 may be a class having a same shape as the class 720 of FIG. 7.

Figure 8E:
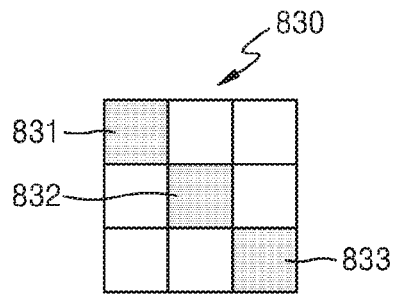

FIG. 8E indicates the class 830 of an index 4. The class 830 of an index 4 may indicate a vertical direction. For example, the video decoding apparatus 300 may select a plurality of pixels, based on the class 830. The plurality of pixels may include the current reconstructed pixel 832, a neighboring pixel 831, and a neighboring pixel 833. The class 830 may be a class having a same shape as the class 730 of FIG. 7.

Figure 8F:
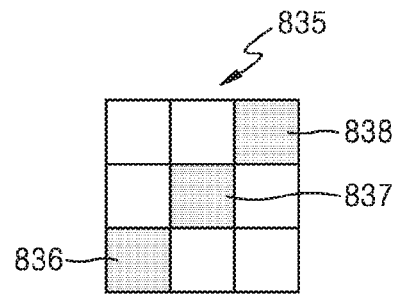

FIG. 8F indicates the class 835 of an index 5. The class 835 of an index 5 may indicate a vertical direction. For example, the video decoding apparatus 300 may select a plurality of pixels, based on the class 835. The plurality of pixels may include the current reconstructed pixel 837, a neighboring pixel 836, and a neighboring pixel 838. The class 835 may be a class having a same shape as the class 740 of FIG. 7.

Figure 8G:
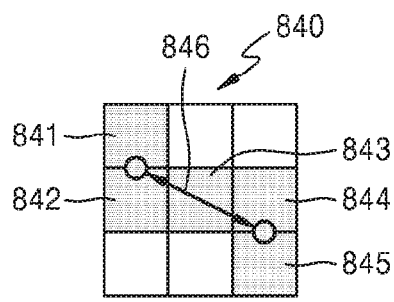

FIG. 8G indicates the class 840 of an index 6. The class 840 of an index 6 may indicate a direction 846. For example, the video decoding apparatus 300 may select a plurality of pixels, based on the class 840. The plurality of pixels may include the reconstructed pixel 843, and an upper left pixel 841, a left pixel 842, a right pixel 844, and a lower right pixel 845 which are relative to the reconstructed pixel 843.

Figure 8H:
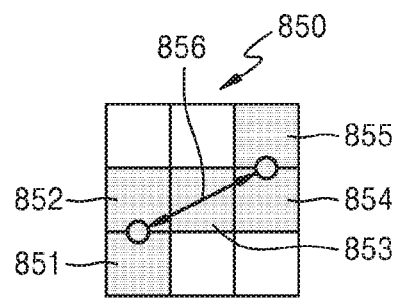

FIG. 8H indicates the class 850 of an index 7. The class 850 of an index 7 may indicate a direction 856. For example, the video decoding apparatus 300 may select a plurality of pixels, based on the class 850. The plurality of pixels may include the reconstructed pixel 853, and a lower left pixel 851, a left pixel 852, a right pixel 854, and an upper right pixel 855 which are relative to the reconstructed pixel 853.

Figure 8I:
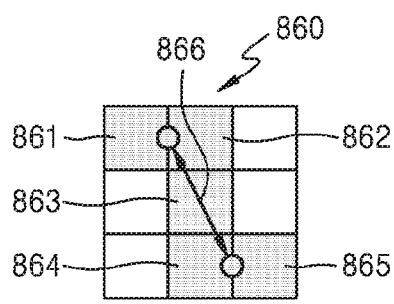

FIG. 8I indicates the class 860 of an index 8. The class 860 of an index 8 may indicate a direction 866. For example, the video decoding apparatus 300 may select a plurality of pixels, based on the class 860. The plurality of pixels may include the reconstructed pixel 863, and an upper left pixel 861, an upper pixel 862, a lower pixel 864, and a lower right pixel 865 which are relative to the reconstructed pixel 863.

Figure 8J:
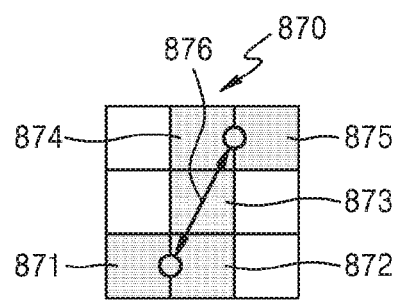

FIG. 8J indicates the class 870 of an index 9. The class 870 of an index 9 may indicate a direction 876. For example, the video decoding apparatus 300 may select a plurality of pixels, based on the class 870. The plurality of pixels may include the reconstructed pixel 873, and a lower left pixel 871, a lower pixel 872, an upper pixel 874, and an upper right pixel 875 which are relative to the reconstructed pixel 873.

At least one of the class 810 through the class 870 may be allocated to an edge type. At least one of the class 810 through the class 870 may be allocated to a mean value type. At least one of the class 810 through the class 870 may be allocated to a median value type. At least one of the class 810 through the class 870 may not be allocated to any type. In addition, the video encoding apparatus 100 and the video decoding apparatus 300 may differently set categories according to classes.

For example, referring to FIG. 6B, the edge type may include class 1 through class 15. For example, class 1 may be the class 820. Class 2 may be the class 825. Class 3 may be the class 830. Class 4 may be the class 835. Class 5 may be the class 810. Class 6 may be the class 820. Class 7 may be the class 825. Class 8 may be the class 830. Class 9 may be the class 835. Class 10 may be the class 840. Class 11 may be the class 850. Class 12 may be the class 860. Class 13 may be the class 870. Class 14 may be the class 810. Class 15 may be the class 815.

In the example above, class 1 through class 4 have the same shapes as class 6 through class 9. Class 5 has a class having the same shape as class 14. In this regard, the video encoding apparatus 100 and the video decoding apparatus 300 may determine categories of class 1 through class 4 as will be described with reference to FIGS. 9A and 9B. Also, the video encoding apparatus 100 and the video decoding apparatus 300 may determine categories of class 5 through class 15 as will be described with reference to FIG. 10. Also, the video encoding apparatus 100 and the video decoding apparatus 300 may determine a reference value to be a mean value with respect to class 5 through class 13. Also, the video encoding apparatus 100 and the video decoding apparatus 300 may determine a reference value to be a median value with respect to class 14 and class 15.

The video decoding apparatus 300 may select a plurality of pixels from among pixels adjacent to a reconstructed pixel, based on a class, and may calculate a reference value based on sample values of the plurality of pixels. In order to calculate the reference value, the video decoding apparatus 300 may use not only the sample values of the plurality of pixels but may also use a sample value of the reconstructed pixel. For example, the video decoding apparatus 300 may parse offset values, an offset type, and a class from a bitstream. The offset type parsed from the bitstream may be an edge type. The class parsed from the bitstream may be an index 6. The video decoding apparatus 300 may select the plurality of pixels, based on the class 840. For example, the video decoding apparatus 300 may select a plurality of pixels, based on the class 840. The plurality of pixels may include the reconstructed pixel 843, and the upper left pixel 841, the left pixel 842, the right pixel 844, and the lower right pixel 845 which are relative to the reconstructed pixel 843.

The video decoding apparatus 300 may determine a method of determining a category, based on the offset type and an index of the class. According to an embodiment of the present disclosure, when the offset type is the edge type and the class is an index 3, the video decoding apparatus 300 may compare the reconstructed pixel 822 with the neighboring pixel 821, and may compare the reconstructed pixel 822 with the neighboring pixel 823, thereby determining a category. Such method of determining a category will be described in detail below with reference to FIGS. 9A and 9B.

According to another embodiment of the present disclosure, the offset type parsed by the video decoding apparatus 300 may be the edge type. Also, the class parsed by the video decoding apparatus 300 may be an index 6. Unlike to the index 3, the index 6 may differently determine a category. That is, a method of determining a category may be changed according to classes. The video decoding apparatus 300 may calculate the reference value by using a mean value of sample values of the plurality of pixels 841, 842, 843, 844, and 845. In addition, the video decoding apparatus 300 may determine the category, based on a magnitude of a difference value between the reference value and the sample value of the reconstructed pixel 843. The video decoding apparatus 300 may select an offset value corresponding to the category, the offset value being from among the offset values. The video decoding apparatus 300 may compensate for the sample value of the reconstructed pixel 843 by using the selected offset value. Such method of determining a category will be described in detail below with reference to FIG. 10.

When the offset type is the edge type and the class is the index 6, the video decoding apparatus 300 may calculate the reference value by using the mean value of the sample values of the plurality of pixels 841, 842, 843, 844, and 845. In addition, the video decoding apparatus 300 may determine the category, based on the magnitude of the difference value between the reference value and the sample value of the reconstructed pixel 843. The video decoding apparatus 300 may select the offset value corresponding to the category, the offset value being from among the offset values. The video decoding apparatus 300 may compensate for the sample value of the reconstructed pixel 843 by using the selected offset value.

As illustrated in FIGS. 7 and 8, the video encoding apparatus 100 may analyze edge directions of reconstructed pixels included in a current largest coding unit. The video encoding apparatus 100 may determine a direction of a strong edge in the current largest coding unit, thereby determining a class of the current largest coding unit.

With respect to each class, categories may be classified according to edge shapes of a current pixel. Examples of the categories according to the edge shapes will now be described below with reference to FIGS. 9A through 10.

Figure 9B:
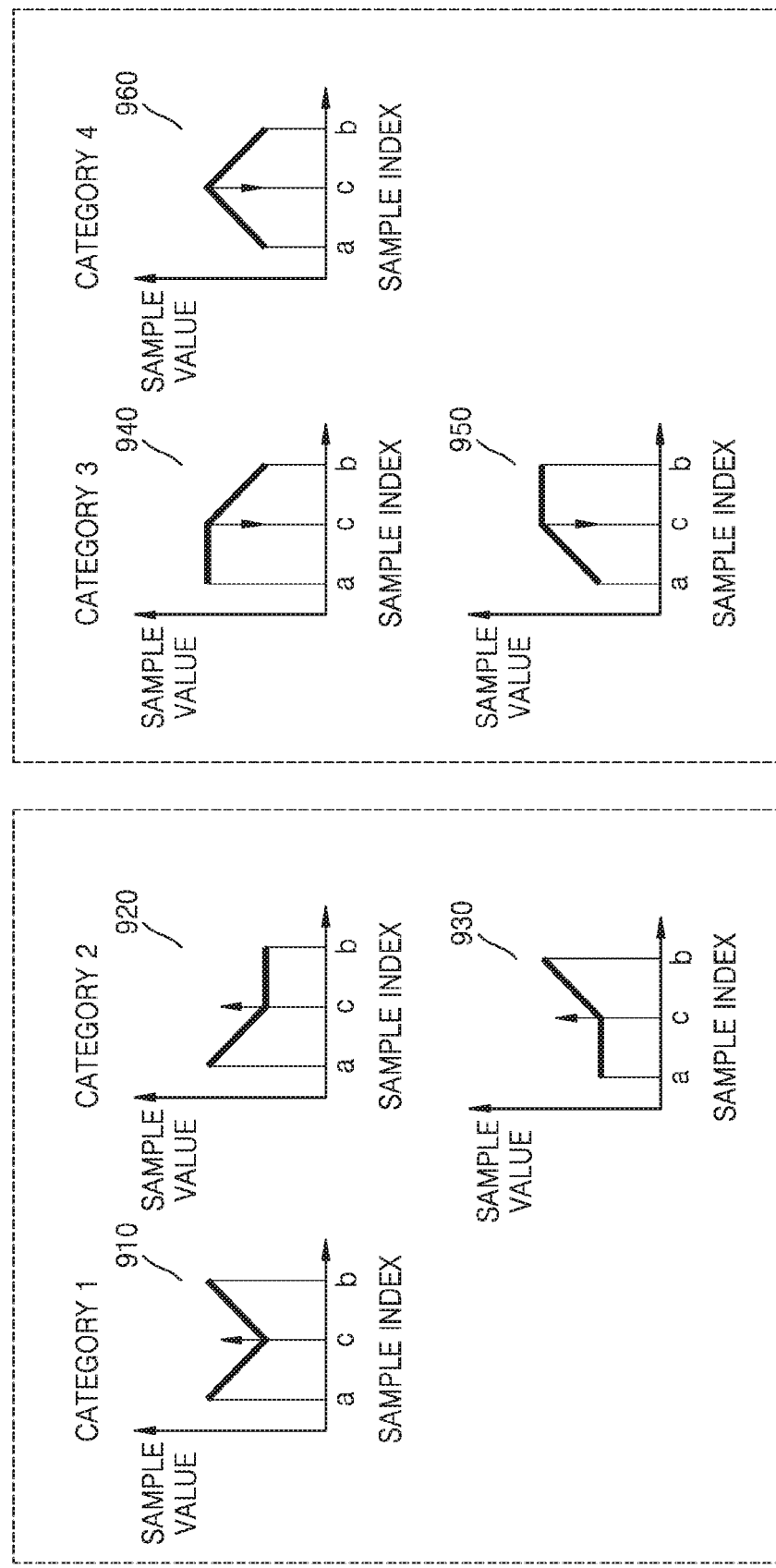

FIGS. 9A and 9B illustrate categories of an edge type, according to an embodiment.

An edge category indicates whether a current pixel corresponds to a lowest point of a concave edge, a pixel positioned at a curved corner around the lowest point of the concave edge, a highest point of a convex edge, or a pixel positioned at a curved corner around the highest point of the convex edge.

FIG. 9A illustrates conditions of determining a category of an edge. FIG. 9B illustrates edge shapes between a reconstructed pixel and neighboring pixels and graphs of samples values c, a, and b.

c indicates an index of the reconstructed pixel, and a and b indicates indexes of the neighboring pixels adjacent to both ends of a current reconstructed pixel according to an edge direction. Xa, Xb, and Xc respectively indicate the samples values of the reconstructed pixels of which indexes are a, b, and c. An x-axis of the graphs of FIG. 9B illustrates indexes of the reconstructed pixel and the neighboring pixels adjacent to both ends of the reconstructed pixel, and a y-axis indicates sample values of pixels.

In the graphs of FIG. 9B, the y-axis may indicate values obtained by scaling the sample values of the samples, based on predetermined scale information. For example, when sample values of some pixels are shifted in a right direction, based on the predetermined scale information, an effect due to noises may be reduced.

Category 1 indicates a case when a current pixel corresponds to a lowest point of the concave edge, i.e., the local valley. As shown in graph 910 (Xc<Xa && Xc<Xb), if the current reconstructed pixel c between the neighboring pixels a and b corresponds to the lowest point of the concave edge, the current reconstructed pixel may be classified as the category 1.

Category 2 indicates a case when a current pixel is positioned at a curved corner around a lowest point of a concave edge, i.e., a concave corner (Xc<Xa && Xc==Xb||Xc==Xa && Xc<Xb). As shown in graph 920 (Xc<Xa && Xc==Xb), if the current reconstructed pixel c between the neighboring pixels a and b is positioned at an end point of a downward curve of a concave edge or, as shown in graph 930 (Xc==Xa && Xc<Xb), if the current reconstructed pixel c is positioned at a start point of an upward curve of a concave edge, the current reconstructed pixel may be classified as the category 2.

Category 3 indicates a case when a current pixel is positioned at a curved corner around a highest point of a convex edge, i.e., a convex corner (Xc>Xa && Xc==Xb||Xc==Xa && Xc>Xb). As shown in graph 940 (Xc>Xa && Xc==Xb), if the current reconstructed pixel c between the neighboring pixels a and b is positioned at a start point of a downward curve of a convex edge or, as shown in graph 950 (Xc==Xa && Xc>Xb), if the current reconstructed pixel c is positioned at an end point of an upward curve of a convex edge, the current reconstructed pixel may be classified as the category 3.

Category 4 indicates a case when a current pixel corresponds to a highest point of a convex edge, i.e., a local peak. As shown in graph 960 (Xc>Xa && Xc>Xb), if the current reconstructed pixel c between the neighboring pixels a and b corresponds to a highest point of a convex edge, the current reconstructed pixel may be classified as the category 4.

If the current reconstructed pixel does not satisfy any of the conditions of the categories 1, 2, 3, and 4, the current reconstructed pixel is classified as category 0, and an offset of category 0 does not need to be separately encoded.

According to an embodiment, with respect to reconstructed pixels corresponding to the same category, a mean value of difference values between the reconstructed pixels and original pixels may be determined to be an offset of a current category. Also, offsets of some categories may be determined.

The concave edges of the categories 1 and 2 of FIGS. 9A and 9B may be smoothed if the sample values of the reconstructed pixels are adjusted by using positive offset values, and may be sharpened due to negative offset values. The convex edges of the categories 3 and 4 may be smoothed due to negative offset values and may be sharpened due to positive offset values.

The video encoding apparatus 100 according to an embodiment may not allow the sharpening effect of edges. Here, the concave edges of the categories 1 and 2 need positive offset values, and the convex edges of the categories 3 and 4 need negative offset values. In this case, if a category of an edge is known, a sign of an offset value may be determined. Accordingly, the video encoding apparatus 100 and the video decoding apparatus 300 may not exchange the sign of the offset value and may exchange only an absolute value of the offset value.

FIG. 10 illustrates categories of an edge type, a mean value type, and a median value type, according to an embodiment of the present disclosure.

The video decoding apparatus 300 may determine a category based on a reconstructed pixel and neighboring pixels of the reconstructed pixel. For example, the video decoding apparatus 300 may determine the category based on a magnitude of a difference value between a reference value and a sample value of the reconstructed pixel. The category may be one of a plurality of categories classified according to a magnitude of a difference value between a sample value of a pixel and a reference value. The difference value may be determined by using Equation (1) below.

$$\text{Difference value} = \text{sample value of reconstructed pixel} - \text{reference value} \quad (1)$$

The video decoding apparatus 300 may compare the difference value with a threshold value, thereby determining a category. For example, referring to FIG. 10, if the difference value is less than a first threshold value, the category may be determined to be a first category. The first threshold value may be −3.0.

If the difference value is equal to or greater than the first threshold value and is less than a second threshold value, the video decoding apparatus 300 may determine the category to be a second category. The second threshold value may be −0.5.

If the difference value is equal to or greater than the second threshold value and is less than a third threshold value, the video decoding apparatus 300 may determine the category to be a third category. The third threshold value may be 0.5.

If the difference value is equal to or greater than the third threshold value and is less than a fourth threshold value, the video decoding apparatus 300 may determine the category to be a fourth category. The fourth threshold value may be 3.0.

If the difference value is equal to or greater than the fourth threshold value, the video decoding apparatus 300 may determine the category to be a fifth category. As described above, the video decoding apparatus 300 may determine a category from among the plurality of categories. The plurality of categories may include the first category through the fifth category.

In addition, as described above, the first threshold value and the second threshold value may be negative numbers, and the third threshold value and the fourth threshold value may be positive numbers.

According to an index number of a class, the video decoding apparatus 300 may use a category determining method described with reference to FIG. 9B, or may use a category determining method described with reference to FIG. 10.

The video encoding apparatus 100 according to an embodiment may not allow a sharpening effect of edges. Here, concave edges of the first category and the second category of FIG. 10 need positive offset values, and convex edges of the fourth category and the fifth category need negative offset values. In this case, if a category of an edge is known, a sign of an offset value may be determined. Accordingly, the video encoding apparatus 100 and the video decoding apparatus 300 may not exchange the sign of the offset value and may exchange only an absolute value of the offset value.

The video encoding apparatus 100 according to another embodiment may allow a sharpening effect of edges. Here, the concave edges of the first category and the second category of FIG. 10 need negative offset values, and the convex edges of the fourth category and the fifth category need positive offset values. In this case, if a category of an edge is known, a sign of an offset value may be determined. Accordingly, the video encoding apparatus 100 and the video decoding apparatus 300 may not exchange the sign of the offset value and may exchange only an absolute value of the offset value. However, it is not limited thereto, and the video encoding apparatus 100 and the video decoding apparatus 300 may also exchange the sign of the offset value.

If the category is the third category, a difference value between a sample value of a pixel adjacent to a reconstructed pixel and a sample value of the reconstructed pixel may not be large. In this case, compensation for the sample value of the reconstructed pixel may not be required. Thus, if the category is determined to be the third category, the video decoding apparatus 300 may not compensate for the sample value of the reconstructed pixel. That is, if the category is the third category, an offset value may be 0. In addition, the video encoding apparatus 100 may not transmit the offset value corresponding to the third category to the video decoding apparatus 300.

The video decoding apparatus 300 may select an offset value corresponding to one of the first category through the fifth category, the offset value being from among offset values received from the video encoding apparatus 100. In addition, the video decoding apparatus 300 may compensate for the sample value of the reconstructed pixel by using the selected offset value.

Hereinafter, an embodiment in which pixels are classified based on the SAO technique when an offset type is an edge type, a mean value type, or a median value type will now be described.

The video encoding apparatus 100 may encode and transmit offset values corresponding to categories of a current class, and the video decoding apparatus 300 may adjust each reconstructed pixel by an offset value of a corresponding category by using the received offset values corresponding to the categories.

For example, if an offset value of an edge type is not 0, the video encoding apparatus 100 may transmit, as the offset value, an absolute value of the offset value and a scale parameter. Because a sign of the offset value may be determined according to a category, the video encoding apparatus 100 does not need to transmit the sign of the offset value.

When the offset type is the edge type, the mean value type, or the median value type, the video decoding apparatus 300 may parse the absolute value of the offset value. The sign of the offset value may be predicted based on a category according to shapes of reconstructed pixels and neighboring pixels.

The video encoding apparatus 100 according to an embodiment may classify pixels based on an edge direction and an edge shape, may determine a mean error value of pixels having a same characteristic to be an offset value, and may determine respective offset values of respective categories. The video encoding apparatus 100 may encode and transmit offset type information indicating the edge type, the mean value type, or the median value type, offset class information indicating the edge direction, and the offset values.

The video decoding apparatus 300 according to an embodiment may receive the offset type information, the offset value, and the offset class information, and if the offset type information indicates the edge type, the mean value type, or the median value type, the video decoding apparatus 300 may determine the edge direction based on the offset class information. The video decoding apparatus 300 may determine each offset value of each category corresponding to an edge shape with respect to each reconstructed pixel, and may adjust a sample value of each reconstructed pixel by each offset value, thereby minimizing an error between an original image and a reconstructed image.

Next, an embodiment in which pixels are classified based on a band type by using the SAO technique will now be described.

According to an embodiment, each of sample values of reconstructed pixels may belong to one of a plurality of bands. For example, the sample values may have a total range from a minimum value Min of 0 to a maximum value Max of $2^{\wedge}(p-1)$ according to p-bit sampling. If the total range (Min, Max) of the sample values is divided into K periods, each period of the sample values is referred to as a band. If $B_k$ indicates a maximum value of a kth band, bands may be divided into $[B_0, B_1-1]$, $[B_1, B_2-1]$, $[B_2, B_3-1]$, ..., and $[B_k-1, B_k]$. If a sample value of a current reconstructed pixel Rec(x,y) belongs to the band $[B_k-1, B_k]$, a current band may be determined to be k. The bands may be equally or unequally divided.

For example, if sample values are classified into equal 8-bit pixel bands, the sample values may be divided into 32 bands. In more detail, they may be classified into bands [0, 7], [8, 15], ..., [240, 247], and [248, 255].

From among a plurality of bands classified according to a band type, a band to which each of sample values of reconstructed pixels belongs may be determined. Also, an offset value indicating a mean of errors between original pixels and reconstructed pixels in each band may be determined.

Accordingly, the video encoding apparatus 100 may encode and transmit an offset corresponding to each of bands classified according to a current band type, and may adjust reconstructed pixels by the offset. Also, the video decoding apparatus 300 may encode and receive an offset corresponding to each of bands classified according to a current band type, and may adjust reconstructed pixels by the offset.

Accordingly, with respect to a band type, the video encoding apparatus 100 and the video decoding apparatus 300 may classify reconstructed pixels according to bands to which their sample values belong, may determine an offset to be a mean error value of reconstructed pixels that belong to the same band, and may adjust the reconstructed pixels by the offset, thereby minimizing an error between an original image and a reconstructed image.

When an offset according to a band type is determined, the video encoding apparatus 100 and the video decoding apparatus 300 may classify reconstructed pixels into categories according to band positions. For example, if the total range of the sample values is divided into K bands, categories may be indexed according to a band index k indicating a kth band. The number of categories may be determined to correspond to the number of bands.

However, in order to reduce data, the video encoding apparatus 100 and the video decoding apparatus 300 may restrict the number of categories used to determine offsets by using the SAO technique. For example, a predetermined number of bands that are continuous from a band having a predetermined start position in a direction in which a band index is increased may be respectively allocated to categories, and only an offset of some categories may be determined.

For example, if a band having an index of 12 is determined to be a start band, four bands from the start band, i.e., bands having indices of 12, 13, 14, and 15 may be allocated to categories 1, 2, 3, and 4. Accordingly, a mean error between reconstructed pixels and original pixels included in a band having the index of 12 may be determined to be an offset of category 1. Similarly, a mean error between reconstructed pixels and original pixels included in a band having the index of 13 may be determined to be an offset of category 2, a mean error between reconstructed pixels and original pixels included in a band having the index of 14 may be determined to be an offset of category 3, and a mean error between reconstructed pixels and original pixels included in a band having the index of 15 may be determined to be an offset of category 4.

In this case, information about a start band position is required to determine positions of bands allocated to categories. Accordingly, the video encoding apparatus 100 may encode and transmit the information about the start band position as the offset class. The video encoding apparatus 100 may encode and transmit an offset type indicating a band type, an offset class, and offset values according to categories. In addition, when the video encoding apparatus 100 transmits an offset value, the video encoding apparatus 100 may transmit only an absolute value of the offset value. Also, the video encoding apparatus 100 may additionally transmit a sign of the offset value.

The video decoding apparatus 300 according to an embodiment may receive the offset type, the offset class, and the offset values according to the categories. If the received offset type is a band type, the video decoding apparatus 300 may read a start band position from the offset class. The video decoding apparatus 300 may determine a band to which reconstructed pixels belong, from among 4 bands from the start band, may determine an offset value allocated to a current band from among the offset values according to the categories, and may adjust sample values of the reconstructed pixels by the offset value.

Hereinabove, an edge type, a mean value type, a median value type, and a band type are introduced as offset types, and an offset class and a category according to the offset type are described in detail. Hereinafter, with reference to FIG. 11, offset parameters encoded and transceived by the video encoding apparatus 100 and the video decoding apparatus 300 will now be described.

Figure 11:
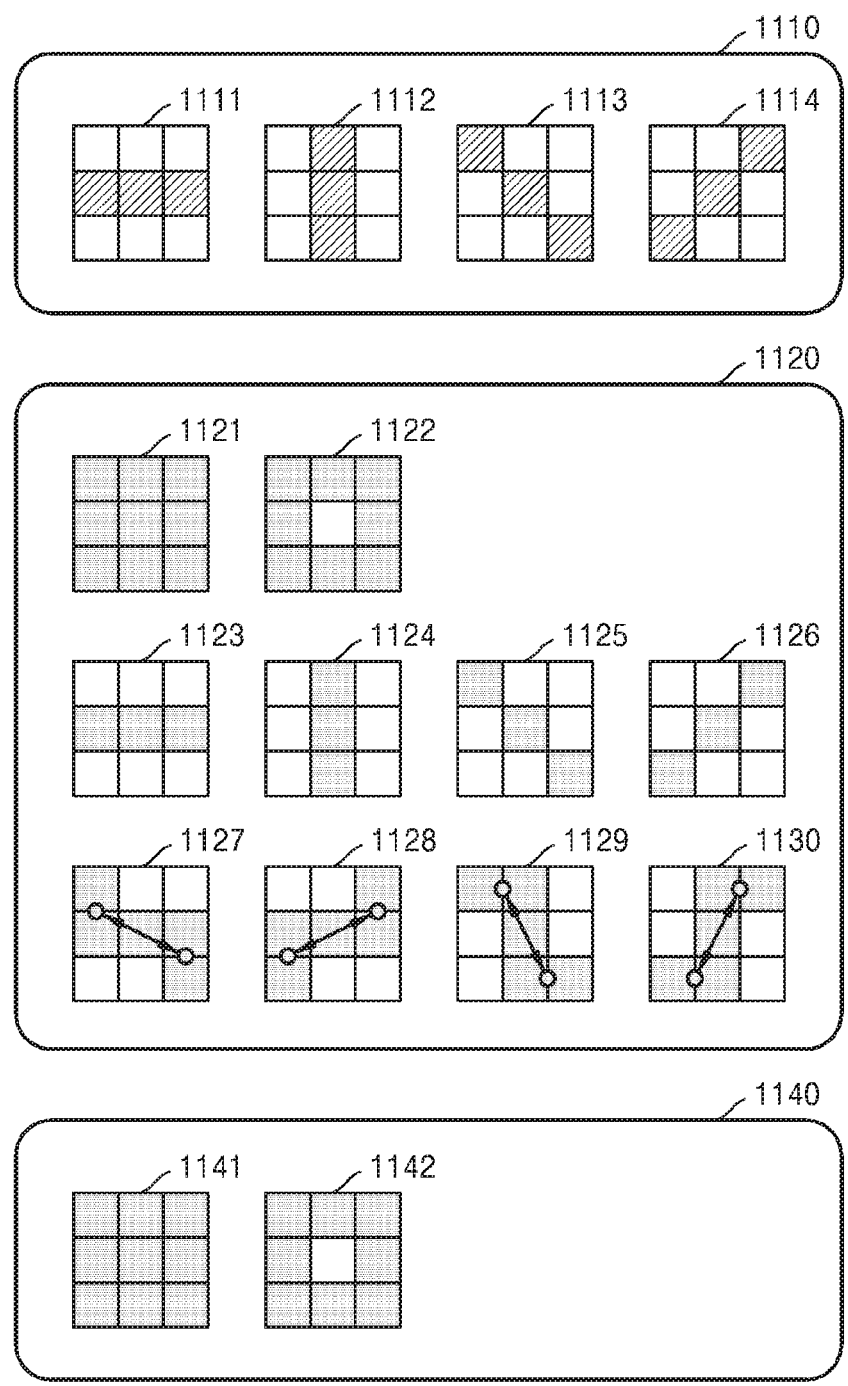
FIG. 11 illustrates offset types and classes, according to an embodiment of the present disclosure.

FIG. 11 illustrates offset types and classes, according to an embodiment of the present disclosure.

According to an embodiment of the present disclosure, classes 1111, 1112, 1113, 1114, 1121, 1122, 1123, 1124, 1125, 1126, 1127, 1128, 1129, 1130, 1141, and 1142 may be 16 classes. The video encoding apparatus 100 and the video decoding apparatus 300 may each have a band type. However, for convenience of description, a band type is not illustrated in FIG. 11.

According to an embodiment of the present disclosure, the video decoding apparatus 300 may determine an offset type and a class as described with reference to FIG. 6C. For example, an offset type 1110 may be an edge type. The class 1111 may have an index of 1. The class 1112 may have an index of 2. The class 1113 may have an index of 3. The class 1114 may have an index of 4.

An offset type 1120 may be a mean value type. The class 1121 may have an index of 1. The class 1122 may have an index of 2. The class 1123 may have an index of 3. The class 1124 may have an index of 4. The class 1125 may have an index of 5. The class 1126 may have an index of 6. The class 1127 may have an index of 7. The class 1128 may have an index of 8. The class 1129 may have an index of 9. The class 1130 may have an index of 10.

An offset type 1140 may be a median value type. The class 1141 may have an index of 1. The class 1142 may have an index of 2.

Unlike to the aforementioned descriptions, the classes 1111, 1112, 1113, 1114, 1121, 1122, 1123, 1124, 1125, 1126, 1127, 1128, 1129, 1130, 1141, and 1142 may each have an index of 1 through 16.

Also, as described with reference to FIG. 6B, the offset types 1110, 1120, and 1140 of the video decoding apparatus 300 according to another embodiment of the present disclosure may be all edge types. The classes 1111, 1112, 1113, 1114, 1121, 1122, 1123, 1124, 1125, 1126, 1127, 1128, 1129, 1130, 1141, and 1142 may each have an index of 1 through 16.

Categories of the classes 1111, 1112, 1113, and 1114 may be determined as described with reference to FIGS. 9A and 9B.

The video decoding apparatus 300 may calculate a mean value of selected pixels (that are shaded) around a reconstructed pixel, with respect to the classes 1121, 1122, 1123, 1124, 1125, 1126, 1127, 1128, 1129, and 1130. The calculated mean value may correspond to a reference value. The video decoding apparatus 300 may determine a category based on the reference value.

The video decoding apparatus 300 may calculate a median value of selected pixels (that are shaded) around a reconstructed pixel, with respect to the classes 1141 and 1142. The calculated median value may correspond to a reference value. The video decoding apparatus 300 may determine a category based on the reference value.

The video encoding apparatus 100 and the video decoding apparatus 300 according to an embodiment may determine an offset type according to a pixel classification method of reconstructed pixels of each largest coding unit.

The offset type may be determined according to image characteristics of some blocks. For example, with respect to a largest coding unit including a vertical edge, a horizontal edge, a diagonal edge, etc., in order to compensate for a sample value, offset values may be determined by classifying sample values according to an edge type. With respect to a largest coding unit not including an edge region, offset values may be determined according to band classification. Accordingly, the video encoding apparatus 100 and the video decoding apparatus 300 may signal the offset type with respect to each of largest coding units.

The video encoding apparatus 100 and the video decoding apparatus 300 may determine offset parameters with respect to each largest coding unit. That is, offset types of reconstructed pixels of a largest coding unit may be determined, the reconstructed pixels of the largest coding unit may be classified into categories, and offset values may be determined according to the categories.

From among the reconstructed pixels included in the largest coding unit, the video encoding apparatus 100 may determine a mean error of reconstructed pixels classified into the same category to be an offset value. An offset value of each category may be determined.

According to an embodiment, the offset parameters may include an offset type, offset values, and an offset class. The offset value may be expressed as at least one of an offset absolute value and a scale parameter. The video encoding apparatus 100 and the video decoding apparatus 300 may transceive the offset parameters determined with respect to each largest coding unit.

From among offset parameters of a largest coding unit, the video encoding apparatus 100 according to an embodiment may encode and transmit the offset type and the offset values. If the offset type is an edge type, a mean value type, or a median value type, the video encoding apparatus 100 may further transmit an offset class indicating an edge direction, which is followed by the offset type and the offset values according to categories. If the offset type is a band type, the video encoding apparatus 100 may further transmit an offset class indicating a start band position, which is followed by the offset type and the offset values according to categories.

The video decoding apparatus 300 according to an embodiment may receive the offset parameters of each largest coding unit, which includes the offset type, the offset values, and the offset class. Also, the video decoding apparatus 300 according to an embodiment may select an offset value of a category to which each reconstructed pixel belongs, from among the offset values according to categories, and may adjust the reconstructed pixel by the selected offset value.

An embodiment in which offset values from among offset parameters are transceived will now be described.

However, as described above, with respect to the edge type, because the offset value may be predicted as a positive number or a negative number according to a category, the sign information does not need to be transmitted.

According to an embodiment, an offset value Off-set may be previously restricted within a range from a minimum value MinOffSet and a maximum value MaxOffSet before the offset value is determined (MinOffSet≤Off-Set≤MaxOffSet). The video encoding apparatus 100 may determine the maximum value MaxOffSet, based on a bit depth.

For example, with respect to an edge type, offset values of reconstructed pixels of categories 1 and 2 may be determined within a range from a minimum value of 0 to a maximum value of 7. With respect to the edge type, offset values of reconstructed pixels of categories 3 and 4 may be determined within a range from a minimum value of −7 to a maximum value of 0.

For example, with respect to a band type, offset values of reconstructed pixels of all categories may be determined within a range from a minimum value of −7 to a maximum value of 7.

In order to reduce transmission bits of an offset value, a residual offset value (remainder) may be restricted to a p-bit value instead of a negative number. In this case, the remainder may be equal to or greater than 0 and may be equal to or less than a difference value between the maximum value and the minimum value (0≤Remainder≤MaxOffSet−MinOffSet+1≤2^p). If the video encoding apparatus 100 transmits the remainder and the video decoding apparatus 300 knows at least one of the maximum value and the minimum value of the offset value, an original offset value may be reconstructed by using only the received remainder.

Hereinafter, offset mergence information from among offset parameters will now be described in detail.

Offset types and/or offset values of some blocks in neighboring blocks may be probably the same. The video encoding apparatus 100 according to an embodiment may compare offset parameters of a current block with offset parameters of the neighboring blocks and may merge and encode the offset parameters of the current block and the neighboring blocks if the offset parameters are the same. If the offset parameters of the neighboring blocks are previously encoded, the offset parameters of the current block may be determined by using the offset parameters of the neighboring blocks. Accordingly, the video encoding apparatus 100 may not encode the offset parameters of the current block and may encode only the offset mergence information of the current block.

Before the offset parameters are parsed from a received bitstream, the video decoding apparatus 300 may initially parse the offset mergence information and may determine whether to parse the offset parameters. The video decoding apparatus 300 may determine the offset parameter of the current block by using the offset parameters of the neighboring blocks, based on the offset mergence information of the current block.

For example, if the neighboring blocks having the same offset parameters as those of the current block exist based on the offset mergence information, the video decoding apparatus 300 may not parse the offset parameters of the current block and may determine the offset parameter of the current block by using a reconstructed offset parameter of a neighboring block. Accordingly, the video decoding apparatus 300 may reconstruct the offset parameters of the current block to be the same as those of the neighboring block. Also, based on the offset mergence information, a neighboring block having offset parameters to be referred to from among the neighboring blocks may be determined. For example, whether to use an offset parameter of a left block of the current block may be determined. Also, whether to use an offset parameter of an upper block of the current block may be determined.

For example, if the offset parameters of the neighboring blocks are different from the offset parameters of the current block based on the offset mergence information, the video decoding apparatus 300 may parse and reconstruct the offset parameters of the current block from the bitstream.

Figure 12:
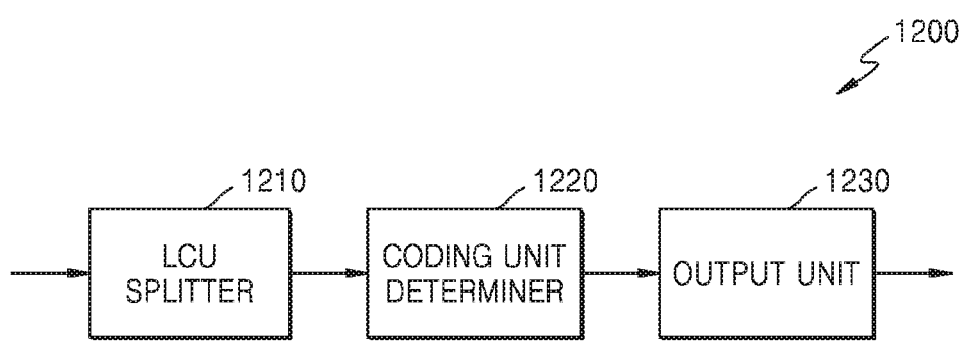
FIG. 12 illustrates a block diagram of a video encoding apparatus based on coding units according to a tree structure 1200, according to an embodiment of the present disclosure.

FIG. 12 illustrates a block diagram of a video encoding apparatus based on coding units according to a tree structure 1200, according to an embodiment of the present disclosure.

The video encoding apparatus 1200 may correspond to the video encoding apparatus 100 of FIG. 1.

The video encoding apparatus involving video prediction based on coding units of the tree structure 1200 includes a largest coding unit splitter 1210, a coding unit determiner 1220, and an output unit 1230. Hereinafter, for convenience of description, the video encoding apparatus involving video prediction based on coding units of the tree structure 1200 is referred to as the 'video encoding apparatus 1200'.

The largest coding unit splitter 1210 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in powers of 2. The image data may be output to the coding unit determiner 1220 according to the at least one largest coding unit.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 1220 encodes at least one split region obtained by splitting a region of the largest coding unit according to depths, and determines a depth to output a finally encoded image data according to the at least one split region. That is, the coding unit determiner 1220 determines an encoding depth by encoding the image data in the deeper coding units according to depths, according to the largest coding unit of the current picture, and selecting a depth having the minimum encoding error. The determined encoding depth and image data according to largest coding units are output to the output unit 1230.

The image data in the largest coding unit is encoded based on the deeper coding units corresponding to at least one depth equal to or below the maximum depth, and results of encoding the image data based on each of the deeper coding units are compared. A depth having the minimum encoding error may be selected after comparing encoding errors of the deeper coding units. At least one encoding depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the encoding depths may differ according to regions in the image data. Thus, one or more encoding depths may be determined in one largest coding unit, and the image data of the largest coding unit may be divided according to coding units of at least one encoding depth.

Accordingly, the coding unit determiner 1220 according to the embodiment may determine coding units having a tree structure included in the current largest coding unit. The 'coding units having a tree structure' according to an embodiment include coding units corresponding to a depth determined to be the encoding depth, from among all deeper coding units included in the current largest coding unit. A coding unit of an encoding depth may be hierarchically determined according to depths in the same region of the largest coding unit, and may be independently determined in different regions. Equally, an encoding depth in a current region may be independently determined from an encoding depth in another region.

A maximum depth according to various embodiments is an index related to the number of splitting times from a largest coding unit to a smallest coding unit A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. In this regard, if the smallest coding unit is a coding unit in which the largest coding unit is split four times, depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 1200 according to the embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 1200 may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit corresponding to an encoding depth according to an embodiment, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split, it becomes a prediction unit of 2N×2N, and a size of a partition may be 2N×2N, 2N×N, N×2N, or N×N. Examples of a partition type may include symmetrical partitions obtained by symmetrically splitting a height or width of the prediction unit, and may selectively include partitions obtained by asymmetrically splitting the height or width of the prediction unit, such as 1:n or n:1, partitions obtained by geometrically splitting the prediction unit, partitions having arbitrary types, or the like.

A prediction mode of the prediction unit may be at least one of an intra mode, an inter mode, and a skip mode. For example, the intra mode and the inter mode may be performed on the partition of 2N×2N, 2N×N, N×2N, or N×N. Also, the skip mode may be performed only on the partition of 2N×2N. The encoding may be independently performed on one prediction unit in a coding unit, so that a prediction mode having a minimum encoding error may be selected.

The video encoding apparatus 1200 according to the embodiment may also perform the transformation on the image data in a coding unit based on not only the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

The transformation unit in the coding unit may be recursively split into smaller sized regions in a manner similar to that in which the coding unit is split according to the tree structure, according to an embodiment. Thus, residual data in the coding unit may be split according to the transformation unit having the tree structure according to transformation depths.

A transformation depth indicating the number of splitting times to reach the transformation unit by splitting the height and width of the coding unit may also be set in the transformation unit according to an embodiment. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Encoding information according to encoding depths requires not only information about an encoding depth but also requires information related to prediction and transformation. Accordingly, the coding unit determiner 1220 not only determines an encoding depth having a minimum encoding error but also determines a partition type in which a prediction unit is split to partitions, a prediction mode according to prediction units, and a size of a transformation unit for transformation.

Coding units according to a tree structure in a largest coding unit and methods of determining a prediction unit/partition, and a transformation unit, according to an embodiment, will be described in detail later with reference to FIGS. 14 through 24.

The coding unit determiner 1220 may measure an encoding error of deeper coding units according to depths by using Rate-Distortion Optimization based on Lagrangian multipliers.

The output unit 1230 outputs, in bitstreams, the image data of the largest coding unit, which is encoded based on the at least one encoding depth determined by the coding unit determiner 1220, and encoding mode information according to depths.

The encoded image data may correspond to a result obtained by encoding residual data of an image.

The encoding mode information according to depths may include encoding depth information, partition type information of the prediction unit, prediction mode information, and the size information of the transformation unit.

Encoding-depth information may be defined by using split information according to depths, which specifies whether encoding is performed on coding units of a lower depth instead of a current depth. If the current depth of the current coding unit is an encoding depth, the current coding unit is encoded by using the coding unit of the current depth, and thus split information of the current depth may be defined not to split the current coding unit to a lower depth. On the contrary, if the current depth of the current coding unit is not the encoding depth, the encoding has to be performed on the coding unit of the lower depth, and thus the split information of the current depth may be defined to split the current coding unit to the coding units of the lower depth.

If the current depth is not the encoding depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed on the coding units having the same depth.

Since the coding units having a tree structure are determined for one largest coding unit, and at least one piece of encoding mode information has to be determined for a coding unit of an encoding depth, at least one piece of encoding mode information may be determined for one largest coding unit. A depth of data of the largest coding unit may also vary according to locations since the data is hierarchically split according to encoding depths, and thus the encoding depth and the encoding mode information may be set for the data.

Accordingly, the output unit 1230 according to an embodiment may assign encoding information about a corresponding encoding depth and an encoding mode to at least one of the coding unit, the prediction unit, and a minimum unit included in the largest coding unit.

The minimum unit according to an embodiment is a square data unit obtained by splitting the smallest coding unit constituting the lowermost encoding depth by 4. Alternatively, the minimum unit according to an embodiment may be a maximum square data unit that may be included in all of the coding units, prediction units, partition units, and transformation units included in the largest coding unit.

For example, the encoding information output by the output unit 1230 may be classified into encoding information according to deeper coding units, and encoding information according to prediction units. The encoding information according to the deeper coding units may include the prediction mode information and the partition size information. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 1230 may encode and output offset parameters such as an offset type, a class, and an offset value related to the offset adjustment technique described above with reference to FIGS. 1 through 11.

According to the simplest embodiment of the video encoding apparatus 1200, the deeper coding unit may be a coding unit obtained by dividing a height and width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 1200 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimum encoding mode may be determined by taking into account characteristics of the coding unit of various image sizes.

Thus, if an image having a high resolution or a large data amount is encoded in a conventional coding unit, the number of coding units per picture excessively increases. Accordingly, the number of pieces of compressed information generated for each coding unit increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

The video encoding apparatus 1200 of FIG. 12 may perform operation of the video encoding apparatus 100 described above with reference to FIG. 1.

The coding unit determiner 1220 may perform operation of the encoder 120 of FIG. 1. An offset type, offset values according to categories, and an offset class may be determined with respect to each largest coding unit.

The output unit 1230 may perform operation of the transmitter 140 of FIG. 1. Offset parameters determined with respect to each largest coding unit may be output. Offset mergence information indicating whether to determine a current offset parameter by using an offset parameter of a largest coding unit adjacent to a current largest coding unit may be first output. As an offset type, an off type, an edge type, a mean value type, a median value type, or a band type may be output. An offset value may be output in an order of an offset absolute value and sign information. With respect to the edge type, the sign information of the offset value may not be output. Also, offset class information may be output.

If the offset mergence information of the current largest coding unit allows adoption of the offset parameters of the adjacent largest coding unit, the offset type and the offset values of the current largest coding unit may not be output.

Figure 13:
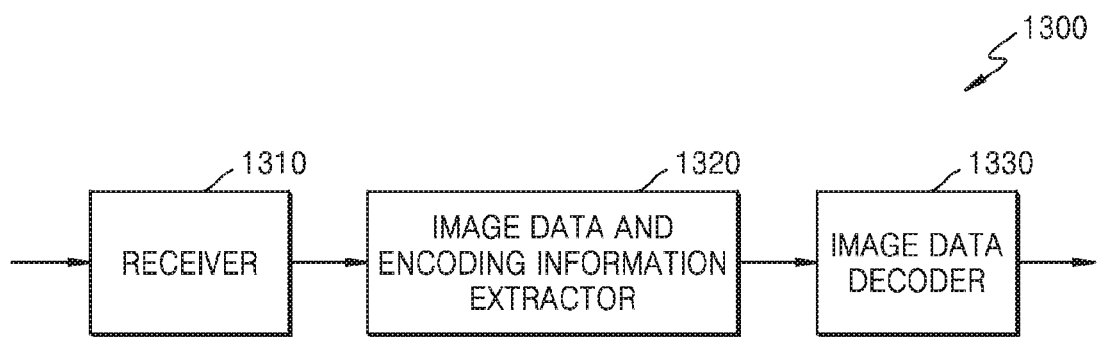
FIG. 13 illustrates a block diagram of a video decoding apparatus based on coding units according to a tree structure 1300, according to an embodiment of the present disclosure.

FIG. 13 illustrates a block diagram of a video decoding apparatus based on coding units according to a tree structure 1300, according to an embodiment of the present disclosure.

The video decoding apparatus involving video prediction based on coding units of the tree structure 1300 according to the embodiment includes a receiver 1310, an image data and encoding information extractor 1320, and an image data decoder 1330. Hereinafter, for convenience of description, the video decoding apparatus involving video prediction based on coding units of the tree structure 1300 according to the embodiment is referred to as the 'video decoding apparatus 1300'.

Definitions of various terms such as a coding unit, a depth, a prediction unit, a transformation unit, and various types of encoding mode information for decoding operations of the video decoding apparatus 1300 according to the embodiment are identical to those described with reference to FIG. 12 and the video encoding apparatus 1200.

The receiver 1310 receives and parses a bitstream of an encoded video. The image data and encoding information extractor 1320 extracts encoded image data for each coding unit from the parsed bitstream, wherein the coding units have a tree structure according to each largest coding unit, and outputs the extracted image data to the image data decoder 1330. The image data and encoding information extractor 1320 may extract information about a maximum size of a coding unit of a current picture, from a header about the current picture, a sequence parameter set, or a picture parameter set.

Also, the image data and encoding information extractor 1320 extracts, from the parsed bitstream, encoding depth information and encoding mode information with respect to the coding units having a tree structure according to each largest coding unit. The extracted encoding depth information and encoding mode information are output to the image data decoder 1330. That is, the image data in a bitstream is split into the largest coding unit so that the image data decoder 1330 may decode the image data for each largest coding unit.

Encoding depth information and encoding mode information according to each of the largest coding units may be set for one or more pieces of encoding depth information, and encoding mode information according to encoding depths may include partition type information of a corresponding coding unit, prediction mode information, and size information of a transformation unit. Also, as the encoding depth information, the split information according to depths may be extracted.

The encoding depth information and the encoding mode information according to each of the largest coding units extracted by the image data and encoding information extractor 1320 are encoding depth information and encoding mode information determined to generate a minimum encoding error when an encoder, such as the video encoding apparatus 1200, repeatedly performs encoding on each deeper coding unit according to depths according to each largest coding unit. Accordingly, the video decoding apparatus 1300 may reconstruct an image by decoding data according to an encoding method that generates the minimum encoding error.

Because the encoding depth information and the encoding mode information may be assigned to a predetermined data unit from among a corresponding coding unit, a prediction unit, and a minimum unit, the image data and encoding information extractor 1320 may extract the encoding depth information and the encoding mode information according to the predetermined data units. If the encoding depth information and the encoding mode information of a corresponding largest coding unit are recorded according to each of the predetermined data units, predetermined data units having the same depth and the split information may be inferred to be the data units included in the same largest coding unit.

The image data decoder 1330 reconstructs the current picture by decoding the image data in each largest coding unit based on the encoding depth information and the encoding mode information according to each of the largest coding units. That is, the image data decoder 1330 may decode the encoded image data, based on a read partition mode, a prediction type, and a transformation unit for each coding unit from among the coding units having the tree structure included in each largest coding unit. A decoding process may include a prediction process including intra prediction and motion compensation, and an inverse transformation process.

The image data decoder 230 may perform intra prediction or motion compensation according to a partition and a prediction mode of each coding unit, based on the information about the partition type and the prediction mode of the prediction unit of the coding unit according to encoding depths.

In addition, for inverse transformation for each largest coding unit, the image data decoder 1330 may read information about a transformation unit according to a tree structure for each coding unit so as to perform inverse transformation based on transformation units for each coding unit. Due to the inverse transformation, a pixel value of a spatial domain of the coding unit may be reconstructed.

The image data decoder 1330 may determine an encoding depth of a current largest coding unit by using split information according to depths. If the split information indicates that image data is no longer split in the current depth, the current depth is an encoding depth. Accordingly, the image data decoder 1330 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 1330 in the same encoding mode. As such, the current coding unit may be decoded by obtaining the information about the encoding mode for each coding unit.

Also, the video decoding apparatus 1300 of FIG. 13 may perform operation of the video decoding apparatus 300 described above with reference to FIG. 3.

The image data and encoding information extractor 1320 and the receiver 1310 may perform operations of at least one of the extractor 320 and the offset determiner 340 of the video decoding apparatus 300 of FIG. 3. The image data decoder 1330 may perform operations of at least one of the offset determiner 340 and the pixel compensator 360 of the video decoding apparatus 300.

If offset mergence information is only parsed from a bitstream without offset parameters of a current largest coding unit, the image data and encoding information extractor 1320 may reconstruct the current offset parameter by using at least one of neighboring offset parameters. For example, the image data and encoding information extractor 1320 may reconstruct the current offset parameter to be similar to at least one of the neighboring offset parameters. Based on the offset mergence information, a parameter among the neighboring offset parameters which is to be referred to may be determined. If it is determined that the current offset parameter is different from the neighboring offset parameters based on the offset mergence information of the current largest coding unit, which is parsed from the bitstream, the image data and encoding information extractor 1320 may parse and reconstruct the offset parameters of the current largest coding unit from the bitstream.

The image data and encoding information extractor 1320 may parse an offset absolute value and a scale parameter from the bitstream. Also, the image data and encoding information extractor 1320 may determine offset values, based on the offset absolute value and the scale parameter. For example, the image data and encoding information extractor 1320 may determine the offset values by performing a shift operation on the offset absolute value by the scale parameter.

In addition, the image data and encoding information extractor 1320 may parse a sign, the offset absolute value and the scale parameter from the bitstream. Also, the image data and encoding information extractor 1320 may determine offset values, based on the sign, the offset absolute value and the scale parameter.

The image data and encoding information extractor 1320 may parse offset parameters of each largest coding unit from the bitstream. Based on the offset parameters, an offset type, offset values according to categories, and an offset class may be determined. If the offset type of the current largest coding unit is an off type, offset adjustment on the current largest coding unit may be terminated. If the offset type is an edge type, based on a category indicating an edge class indicating an edge direction of each of reconstructed pixels, and an edge shape, a current offset value may be selected from among received offset values. If the offset type is a band type, a band to which each of the reconstructed pixels belongs is determined and an offset value corresponding to a current band may be selected from among the offset values.

The image data decoder 1330 may generate a reconstructed pixel capable of minimizing an error between an original pixel and the reconstructed pixel, by adjusting a pixel value of the reconstructed pixel by an offset value of the reconstructed pixel. Offsets of reconstructed pixels of each largest coding unit may be adjusted based on the parsed offset parameters.

Thus, the video decoding apparatus 1300 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal encoding mode information received from an encoding terminal.

Figure 14:
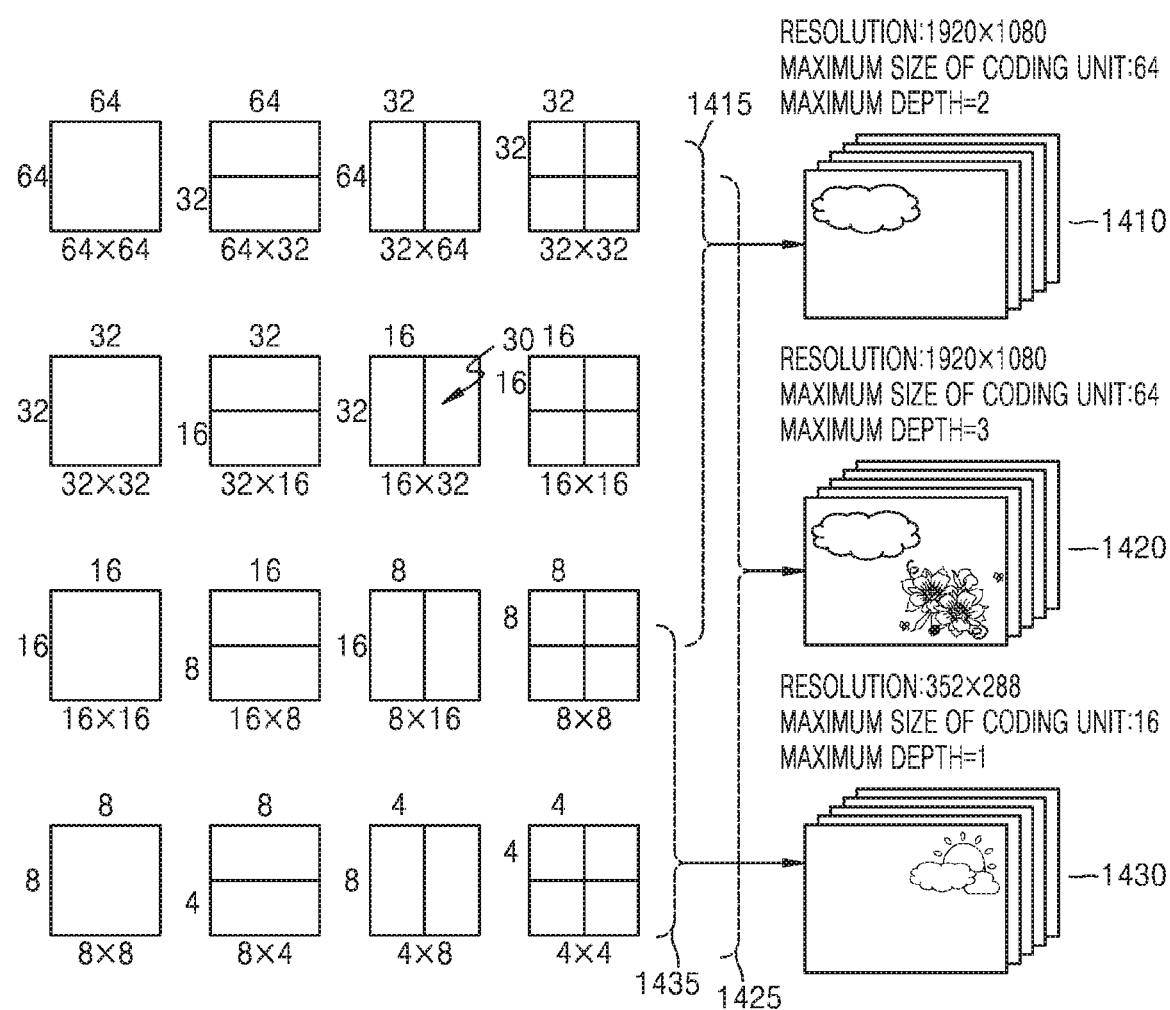
FIG. 14 illustrates a concept of coding units, according to an embodiment of the present disclosure.

FIG. 14 illustrates a concept of coding units, according to an embodiment of the present disclosure.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 1410, a resolution is 1920×1080, a maximum size of a coding unit is 64, and a maximum depth is 2. In video data 1420, a resolution is 1920×1080, a maximum size of a coding unit is 64, and a maximum depth is 3. In video data 1430, a resolution is 352×288, a maximum size of a coding unit is 16, and a maximum depth is 1. The maximum depth shown in FIG. 14 denotes a total number of splits from a largest coding unit to a smallest coding unit.

If a resolution is high or a data amount is large, it is preferable that a maximum size of a coding unit is large so as to not only increase encoding efficiency but also to accurately reflect characteristics of an image. Accordingly, the maximum size of the coding unit of the video data 1410 and 1420 having a higher resolution than the video data 1430 may be selected to 64.

Since the maximum depth of the video data 1410 is 2, coding units 1415 of the vide data 1410 may include a largest coding unit having a long axis size of 64, and coding units having long axis sizes of 32 and 16 since depths are deepened to two layers by splitting the largest coding unit twice. On the other hand, since the maximum depth of the video data 1430 is 1, coding units 1435 of the video data 1430 may include a largest coding unit having a long axis size of 16, and coding units having a long axis size of 8 since depths are deepened to one layer by splitting the largest coding unit once.

Since the maximum depth of the video data 1420 is 3, coding units 1425 of the video data 1420 may include a largest coding unit having a long axis size of 64, and coding units having long axis sizes of 32, 16, and 8 since the depths are deepened to 3 layers by splitting the largest coding unit three times. As a depth deepens, detailed information may be precisely expressed.

Figure 15:
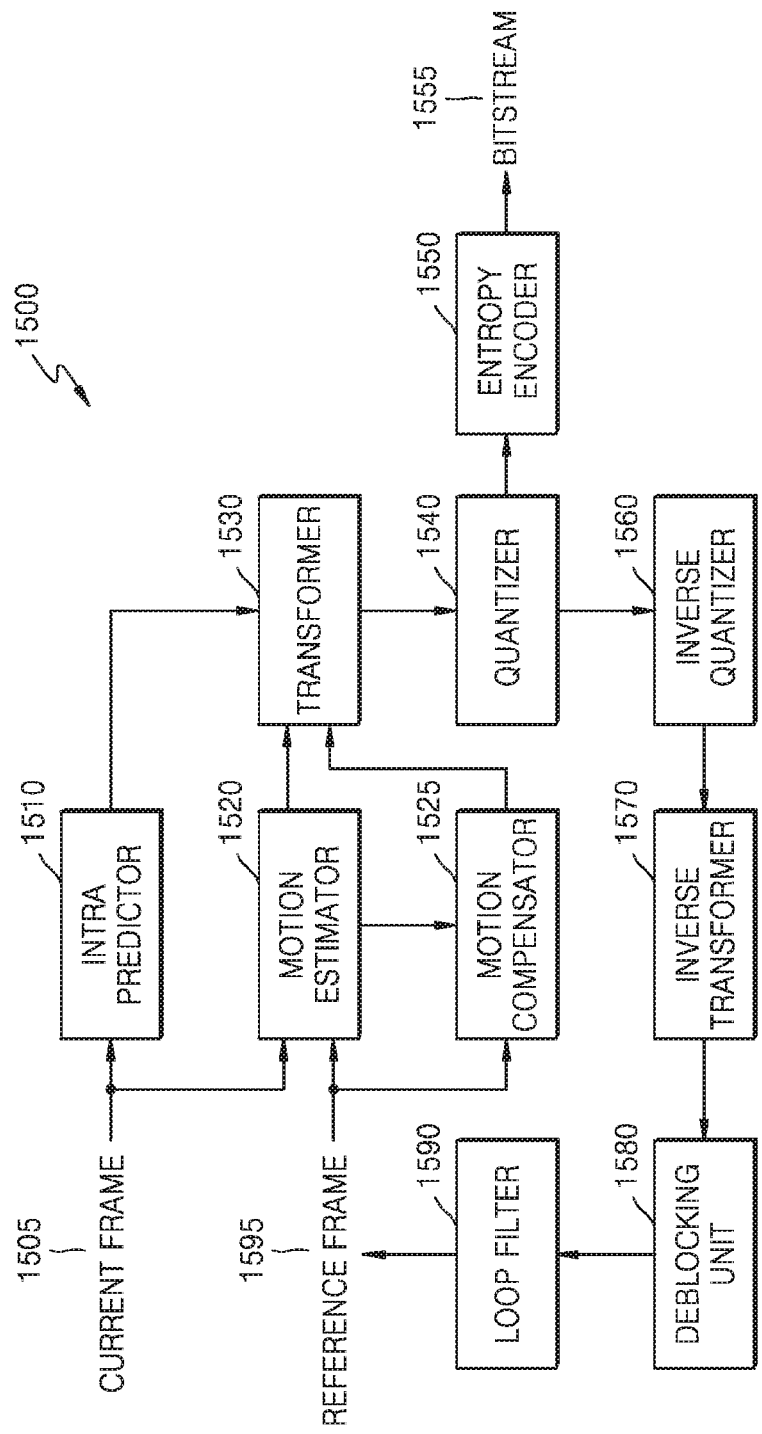
FIG. 15 illustrates a block diagram of an image encoder 1500 based on coding units, according to an embodiment of the present disclosure.

FIG. 15 illustrates a block diagram of an image encoder 1500 based on coding units, according to an embodiment of the present disclosure.

The image encoder 1500 according to an embodiment includes operations of the coding unit determiner 1220 of the video encoding apparatus 1200 of FIG. 12 so as to encode image data. That is, an intra predictor 1510 performs intra prediction on coding units in an intra mode, from among a current frame 1505, and a motion estimator 1520 and a motion compensator 1525 respectively perform inter estimation and motion compensation on coding units in an inter mode from among the current frame 1505 by using the current frame 1505 and a reference frame 1595.

Data output from the intra predictor 1510, the motion estimator 1520, and the motion compensator 1525 is output as a quantized transform coefficient through a transformer 1530 and a quantizer 1540. The quantized transform coefficient is reconstructed as data in the spatial domain through an inverse-quantizer 1560 and an inverse-transformer 1570, and the reconstructed data in the spatial domain is output as the reference frame 1595 after being post-processed through a deblocking unit 1580 and a loop filter 1590. The quantized transform coefficient may be output as a bitstream 1555 through an entropy encoder 1550.

In order for the image encoder 1500 to be applied to the video encoding apparatus 1200 of FIG. 12, all elements of the image encoder 1500, i.e., the intra predictor 1510, the motion estimator 1520, the motion compensator 1525, the transformer 1530, the quantizer 1540, the entropy encoder 1550, the inverse-quantizer 1560, the inverse-transformer 1570, the deblocking unit 1580, and the loop filter 1590 perform operations based on each coding unit among coding units of a tree structure in consideration of the maximum depth of each largest coding unit.

In particular, the intra predictor 1510, the motion estimator 1520, and the motion compensator 1525 determine partitions and a prediction mode of each coding unit from among the coding units of a tree structure in consideration of the maximum size and the maximum depth of a current largest coding unit, and the transformer 1530 determines the size of the transformation unit in each coding unit from among the coding units of a tree structure.

The image encoder 1500 may classify pixels according to an edge type (a median value type, a mean value type, or a band type) of each largest coding unit of the reference frame 1595, may determine an edge direction (or a start band position), and may determine a mean error value of reconstructed pixels included in each category. With respect to each largest coding unit, offset mergence information, an offset type, and offset values may be encoded and signaled.

Figure 16:
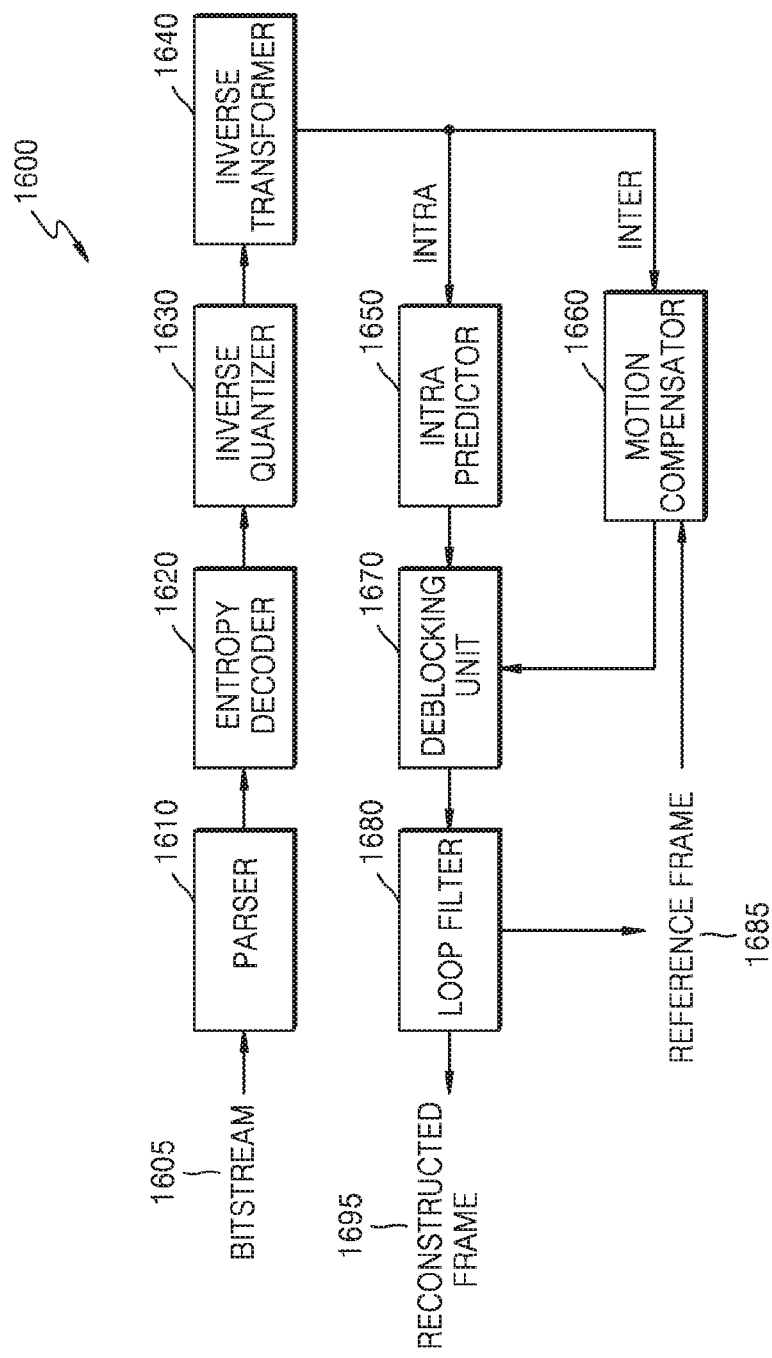
FIG. 16 illustrates a block diagram of an image decoder 1600 based on coding units, according to an embodiment of the present disclosure.

FIG. 16 illustrates a block diagram of an image decoder 1600 based on coding units, according to an embodiment of the present disclosure.

A parser 1610 parses encoded image data to be decoded and information about encoding required for decoding from a bitstream 1605. The encoded image data is output as inverse-quantized data through an entropy decoder 1620 and an inverse-quantizer 1630, and the inverse-quantized data is reconstructed to image data in the spatial domain through an inverse-transformer 1640.

An intra predictor 1650 performs intra prediction on coding units in an intra mode with respect to the image data in the spatial domain, and a motion compensator 1660 performs motion compensation on coding units in an inter mode by using a reference frame 1685.

The image data in the spatial domain, which passed through the intra predictor 1650 and the motion compensator 1660, may be output as a reconstructed frame 1695 after being post-processed through a deblocking unit 1670 and a loop filter 1680. Also, the image data that is post-processed through the deblocking unit 1670 and the loop filter 1680 may be output as the reference frame 1685.

In order for the image data decoder 230 of the video decoding apparatus 200 of FIG. 13 to decode the image data, the image decoder 1600 may perform operations that are performed after the parser 1610.

In order for the image decoder 1600 to be applied to the video decoding apparatus 1300 of FIG. 13, all elements of the image decoder 1600, i.e., the parser 1610, the entropy decoder 1620, the inverse-quantizer 1630, the inverse-transformer 1640, the intra predictor 1650, the motion compensator 1660, the deblocking unit 1670, and the loop filter 1680 perform operations based on coding units of a tree structure for each largest coding unit.

In particular, the intra predictor 1650 and the motion compensator 1660 have to determine a partition and a prediction mode for each of the coding units of a tree structure, and the inverse-transformer 1640 has to determine a size of a transformation unit for each of the coding units.

The image decoder 1600 may extract offset parameters of largest coding units from a bitstream. Based on offset mergence information from among the offset parameters of a current largest coding unit, offset parameters of the current largest coding unit may be reconstructed by using an offset parameter of a neighboring largest coding unit. For example, the offset parameters of the current largest coding unit may be reconstructed to be similar to the offset parameter of the neighboring largest coding unit. By using an offset type and offset values from among the offset parameters of the current largest coding unit, each of reconstructed pixels of largest coding units of the reconstructed frame 1695 may be adjusted by an offset value corresponding to a category according to the edge type or the band type.

Figure 17:
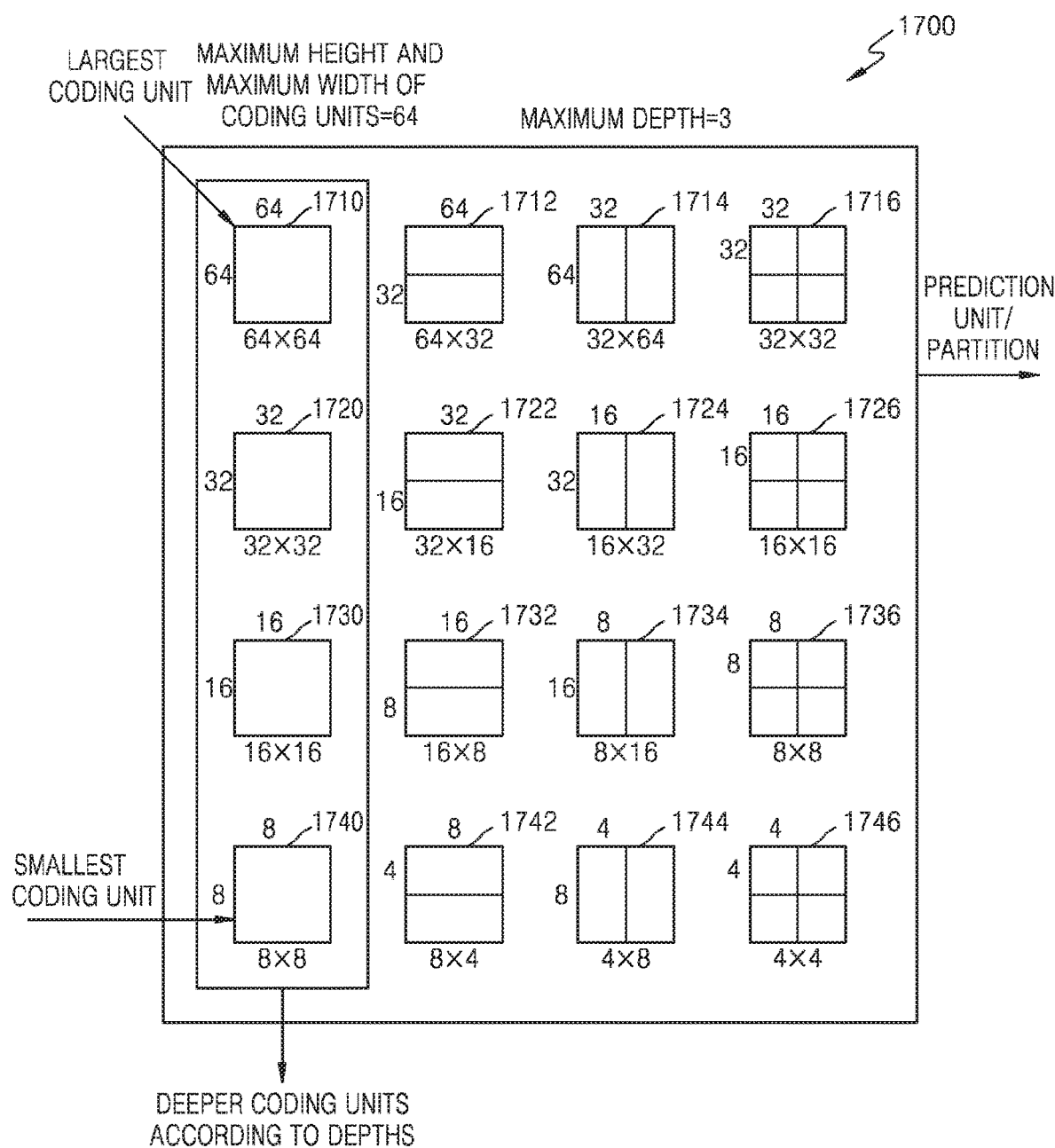
FIG. 17 illustrates deeper coding units according to depths, and partitions, according to an embodiment of the present disclosure.

FIG. 17 illustrates deeper coding units according to depths, and partitions, according to an embodiment of the present disclosure.

The video encoding apparatus 1200 according to an embodiment and the video decoding apparatus 1300 according to an embodiment use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 1700 according to an embodiment, the maximum height and the maximum width of the coding units are each 64, and the maximum depth is 4. In this case, the maximum depth refers to a total number of times the coding unit is split from the largest coding unit to the smallest coding unit. Since a depth deepens along a vertical axis of the hierarchical structure of coding units 1700, a height and a width of the deeper coding unit are each split. Also, a prediction unit and partitions, which are bases for prediction encoding of each deeper coding unit, are shown along a horizontal axis of the hierarchical structure of coding units 1700.

That is, a coding unit 1710 is a largest coding unit in the hierarchical structure of coding units 1700, wherein a depth is 0 and a size, i.e., a height by width, is 64×64. The depth deepens along the vertical axis, and a coding unit 1720 having a size of 32×32 and a depth of 1, a coding unit 1730 having a size of 16×16 and a depth of 2, and a coding unit 1740 having a size of 8×8 and a depth of 3 are present. The coding unit 1740 having a size of 4×4 and a depth of 3 is a smallest coding unit.

The prediction unit and the partitions of a coding unit are arranged along the horizontal axis according to each depth. That is, if the coding unit 1710 having a size of 64×64 and a depth of 0 is a prediction unit, the prediction unit may be split into partitions included in the coding unit 1710 having the size of 64×64, i.e. a partition 1710 having a size of 64×64, partitions 1712 having the size of 64×32, partitions 1714 having the size of 32×64, or partitions 1716 having the size of 32×32.

Equally, a prediction unit of the coding unit 1720 having the size of 32×32 and the depth of 1 may be split into partitions included in the coding unit 1720 having the size of 32×32, i.e. a partition 1720 having a size of 32×32, partitions 1722 having a size of 32×16, partitions 1724 having a size of 16×32, and partitions 1726 having a size of 16×16.

Equally, a prediction unit of the coding unit 1730 having the size of 16×16 and the depth of 2 may be split into partitions included in the coding unit 1730 having the size of 16×16, i.e. a partition 1730 having a size of 16×16 included in the coding unit 1730, partitions 1732 having a size of 16×8, partitions 1734 having a size of 8×16, and partitions 1736 having a size of 8×8.

Equally, a prediction unit of the coding unit 1740 having the size of 8×8 and the depth of 3 may be split into partitions included in the coding unit 1740 having the size of 8×8, i.e. a partition 1740 having a size of 8×8 included in the coding unit 1740, partitions 1742 having a size of 8×4, partitions 1744 having a size of 4×8, and partitions 1746 having a size of 4×4.

In order to determine a depth of the largest coding unit 1710, the coding unit determiner 1220 of the video encoding apparatus 1200 has to perform encoding on coding units respectively corresponding to depths included in the largest coding unit 1710.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a least encoding error that is a representative encoding error of a corresponding depth may be selected by performing encoding on each of prediction units of the coding units according to depths, along the horizontal axis of the hierarchical structure of coding units 1700. Alternatively, the minimum encoding error may be searched for by comparing representative encoding errors according to depths, by performing encoding for each depth as the depth deepens along the vertical axis of the hierarchical structure of coding units 1700. A depth and a partition generating the minimum encoding error in the largest coding unit 1710 may be selected as an encoding depth and a partition type of the largest coding unit 1710.

Figure 18:
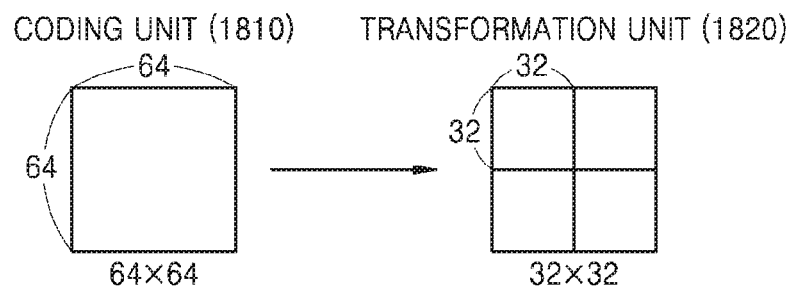
FIG. 18 illustrates a relationship between a coding unit and transformation units, according to an embodiment of the present disclosure.

FIG. 18 illustrates a relationship between a coding unit and transformation units, according to an embodiment of the present disclosure.

The video encoding apparatus 1200 according to an embodiment or the video decoding apparatus 1300 according to an embodiment encodes or decodes an image according to coding units having sizes smaller than or equal to a largest coding unit for each largest coding unit. Sizes of transformation units for transformation during an encoding process may be selected based on data units that are not larger than a corresponding coding unit.

For example, in the video encoding apparatus 1200 or the video decoding apparatus 1300, when a size of the coding unit 1810 is 64×64, transformation may be performed by using the transformation units 1820 having a size of 32×32.

Also, data of the coding unit 1810 having the size of 64×64 may be encoded by performing the transformation on each of the transformation units having the size of 32×32, 16×16, 8×8, and 4×4, which are smaller than 64×64, and then a transformation unit having the minimum coding error with respect to an original image may be selected.

Figure 19:
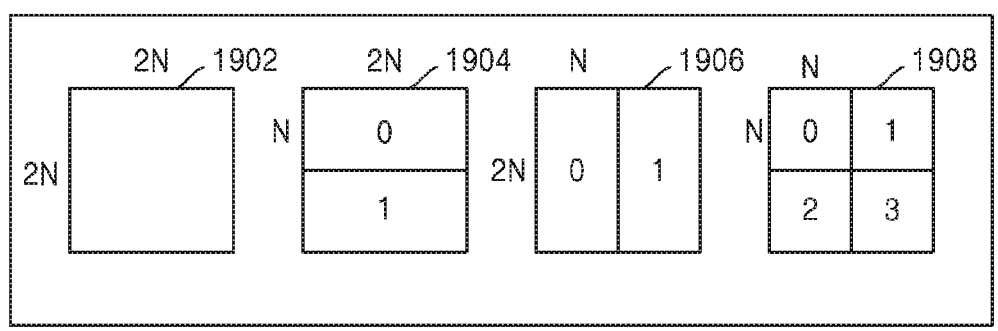
FIG. 19 illustrates a plurality of pieces of encoding information according to depths, according to an embodiment of the present disclosure.
Figure 19:
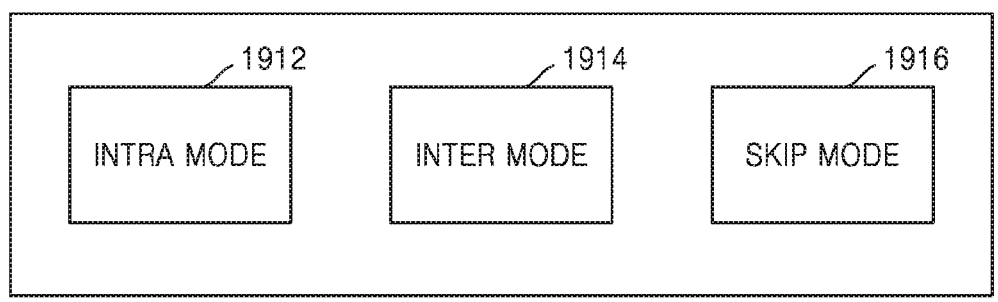
Figure 19:
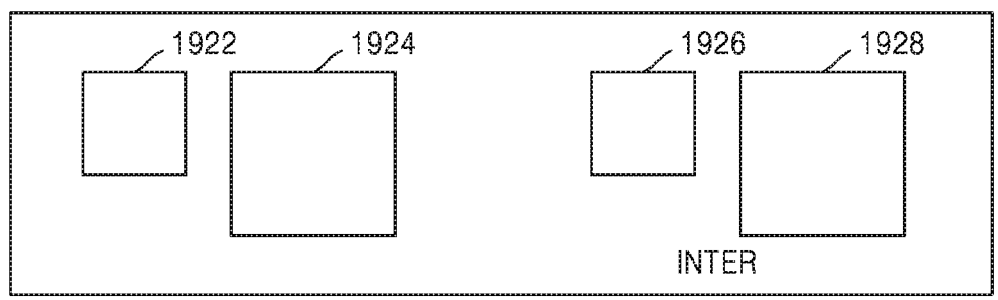

FIG. 19 illustrates a plurality of pieces of encoding information according to depths, according to an embodiment of the present disclosure.

The output unit 1230 of the video encoding apparatus 1200 according to an embodiment may encode and transmit, as encoding mode information, partition type information 1900, prediction mode information 1910, and transformation unit size information 1920 for each coding unit corresponding to an encoding depth.

The partition type information 1900 indicates information about a type of a partition obtained by splitting a prediction unit of a current coding unit, wherein the partition is a data unit for prediction encoding the current coding unit. For example, a current coding unit CU_0 having a size of 2×2N may be split into any one of a partition 1902 having a size of 2N×2N, a partition 1904 having a size of 2N×N, a partition 1906 having a size of N×2N, and a partition 1908 having a size of N×N. In this case, the partition information 1900 about a current coding unit is set to indicate one of the partition 1902 having a size of 2N×2N, the partition 1904 having a size of 2N×N, the partition 1906 having a size of N×2N, and the partition 1908 having a size of N×N.

The prediction mode information 1910 indicates a prediction mode of each partition. For example, the prediction mode information 1910 may indicate a mode of prediction encoding performed on a partition indicated by the partition type information 1900, i.e., an intra mode 1912, an inter mode 1914, or a skip mode 1916.

The transformation unit size information 1920 indicates a transformation unit to be based on when transformation is performed on a current coding unit. For example, the transformation unit may be one of a first intra transformation unit 1922, a second intra transformation unit 1924, a first inter transformation unit 1926, and a second intra transformation unit 1928.

The image data and encoding information receiver 1310 of the video decoding apparatus 1300 may extract and use the partition type information 1900, the prediction mode information 1910, and the transformation unit size information 1920 for each deeper coding unit.

Figure 20:
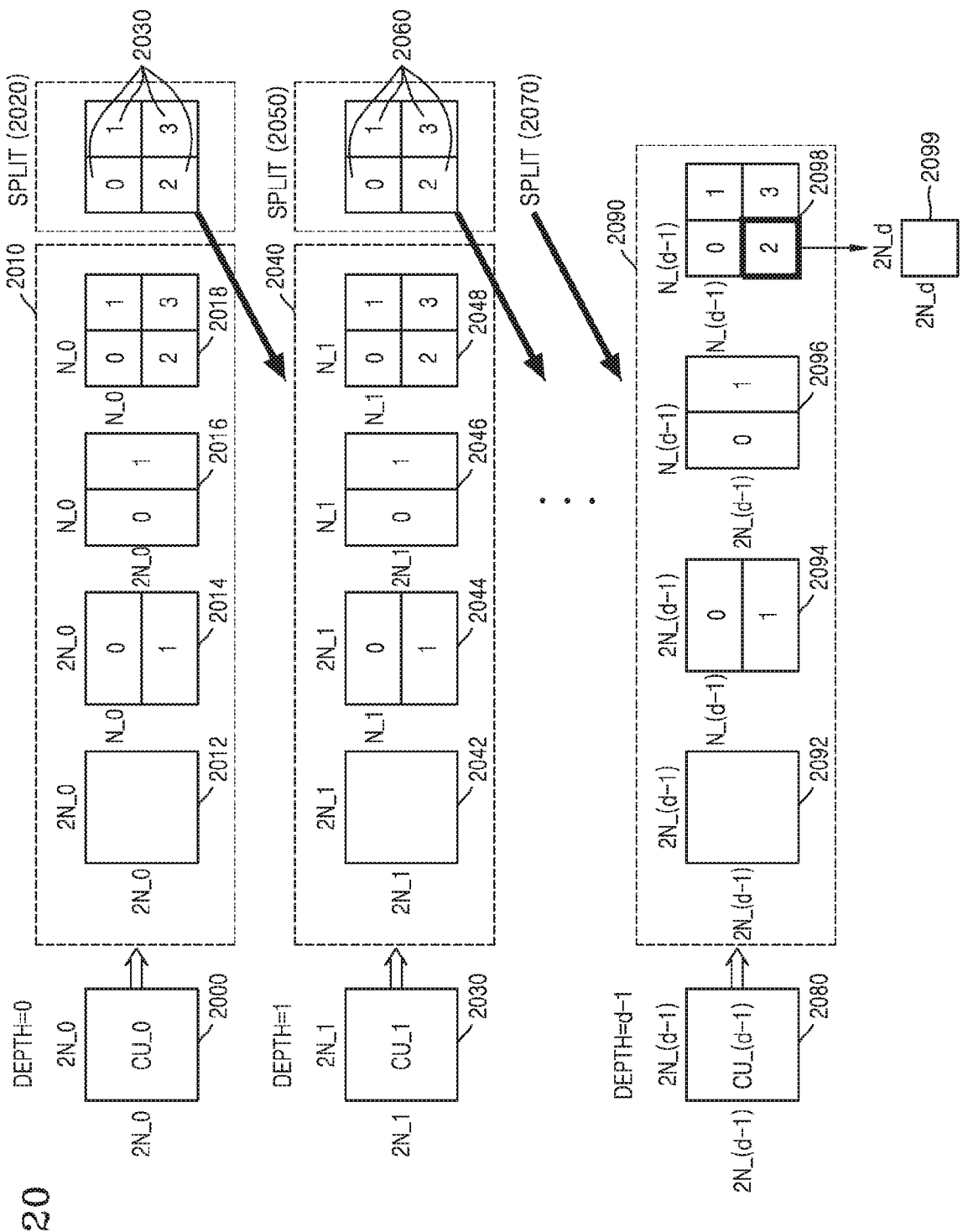
FIG. 20 illustrates deeper coding units according to depths, according to an embodiment of the present disclosure.

FIG. 20 illustrates deeper coding units according to depths, according to an embodiment of the present disclosure.

Split information may be used to represent a change in a depth. The spilt information indicates whether a coding unit of a current depth is split into coding units of a lower depth.

A prediction unit 2010 for prediction encoding a coding unit 2000 having a depth of 0 and a size of 2N_0×2N_0 may include partitions of a partition type 2012 having a size of 2N_0×2N_0, a partition type 2014 having a size of 2N_0×N_0, a partition type 2016 having a size of N_0×2N_0, and a partition type 2018 having a size of N_0×N_0. Only the partition types 2012, 2014, 2016, and 2018 which are obtained by symmetrically splitting the prediction unit are illustrated, but as described above, a partition mode is not limited thereto and may include asymmetrical partitions, partitions having a predetermined shape, and partitions having a geometrical shape.

According to each partition type, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition types 2012, 2014, and 2016 having the sizes of 2N_0×2N_0, 2N_0×N_0 and N_0×2N_0, the prediction unit 2010 may not be split into a lower depth.

If the encoding error is the smallest in the partition type 2018 having the size of N_0×N_0, a depth is changed from 0 to 1 and split is performed (operation 2020), and encoding may be repeatedly performed on coding units 2030 of a partition type having a depth of 2 and a size of N_0×N_0 so as to search for a minimum encoding error.

A prediction unit 2040 for prediction encoding the coding unit 2030 having a depth of 1 and a size of 2N_1×2N_1 (=N_0×N_0) may include a partition type 2042 having a size of 2N_1×2N_1, a partition type 2044 having a size of 2N_1×N_1, a partition type 2046 having a size of N_1×2N_1, and a partition type 2048 having a size of N_1×N_1.

If an encoding error is the smallest in the partition type 2048 having the size of N_1×N_1, a depth is changed from 1 to 2 and split is performed (in operation 2050), and encoding is repeatedly performed on coding units 2060 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split (in operation 2070), a prediction unit 2090 for prediction encoding a coding unit 2080 having a depth of d−1 and a size of 2N_(d−1)×2N_(d−1) may include partitions of a partition type 2092 having a size of 2N_(d−1)×2N_(d−1), a partition type 2094 having a size of 2N_(d−1)×N_(d−1), a partition type 2096 having a size of N_(d−1)×2N_(d−1), and a partition type 2098 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types so as to search for a partition type generating a minimum encoding error.

Even when the partition type 2098 having the size of N_(d−1)×N_(d−1) has the minimum encoding error, since a maximum depth is d, a coding unit CU_(d−1) having a depth of d−1 is no longer split into a lower depth, and an encoding depth for the coding units constituting a current largest coding unit 2000 is determined to be d−1 and a partition type of the current largest coding unit 2000 may be determined to be N_(d−1)×N_(d−1). Also, since the maximum depth is d, split information for the coding unit 2052 corresponding to a depth of d−1 is not set.

A data unit 2099 may be a 'minimum unit' for the current largest coding unit. A minimum unit according to the embodiment may be a square data unit obtained by splitting a smallest coding unit having a lowermost encoding depth by 4. By performing the encoding repeatedly, the video encoding apparatus 1200 according to the embodiment may select a depth generating the minimum encoding error by comparing encoding errors according to depths of the coding unit 2000 to determine an encoding depth, and may set a corresponding partition type and a prediction mode as an encoding mode of the encoding depth.

As such, the minimum encoding errors according to depths are compared in all of the depths of 0, 1, . . . , d−1, d, and a depth having a minimum encoding error may be determined as an encoding depth. The encoding depth, the partition type of the prediction unit, and the prediction mode may be encoded and transmitted as information about the encoding mode. Since a coding unit has to be split from a depth of 0 to an encoding depth, only split information of the encoding depth is also set to '0', and split information of depths excluding the encoding depth is also set to '1'.

The image data and encoding information extractor 1320 of the video decoding apparatus 1300 according to the embodiment may extract and use encoding depth information and prediction unit information about the coding unit 1300 so as to decode the coding unit 2012. The video decoding apparatus 1300 according to an embodiment may determine a depth, in which split information is '0', as an encoding depth by using encoding mode information according to depths, and may use, for decoding, encoding mode information about the corresponding depth.

Figure 21:
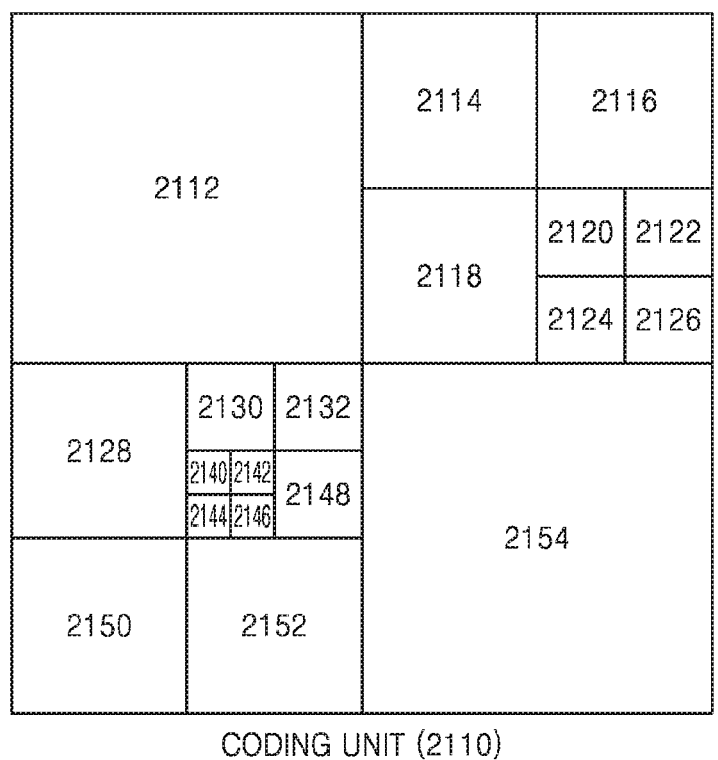
FIGS. 21, 22, and 23 illustrate a relationship between coding units, prediction units, and transformation units, according to an embodiment of the present disclosure.
Figure 22:
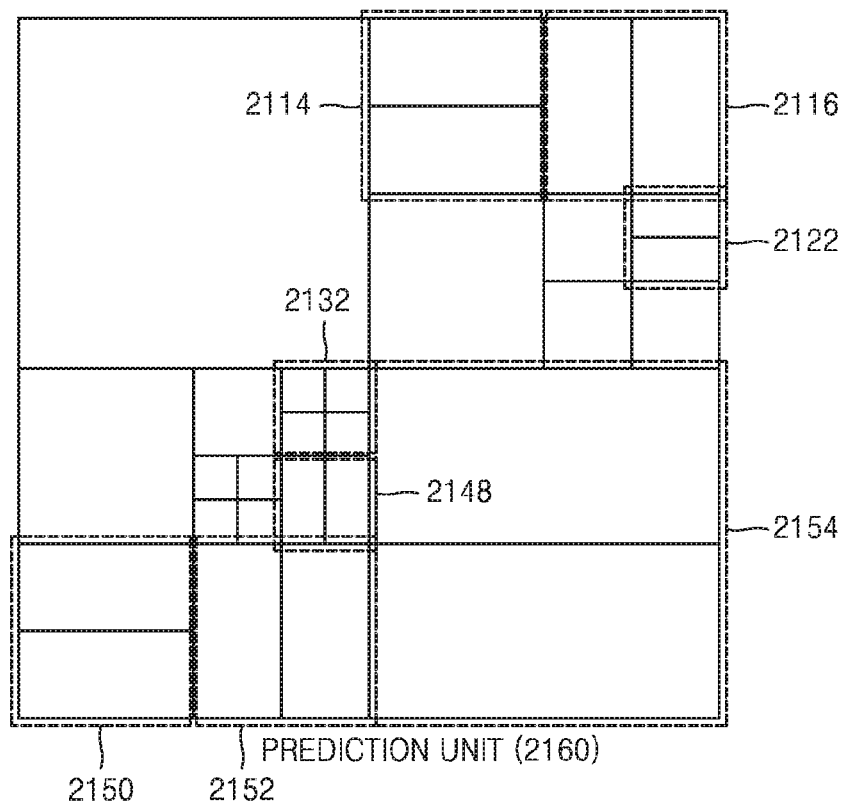
Figure 23:
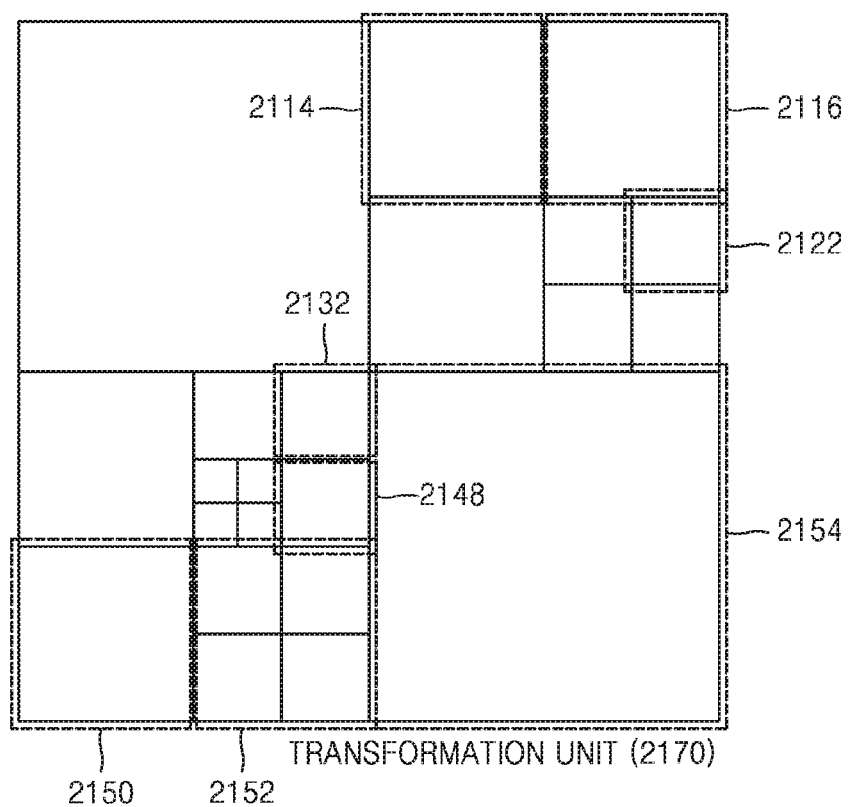

FIGS. 21, 22, and 23 illustrate a relationship between coding units, prediction units, and transformation units, according to an embodiment of the present disclosure.

Coding units 2110 are deeper coding units according to encoding depths determined by the video encoding apparatus 1200, in a largest coding unit. Prediction units 2160 are partitions of prediction units of each of the coding units 2110 according to encoding depths, and transformation units 2170 are transformation units of each of the coding units according to encoding depths.

When a depth of a largest coding unit is 0 in the deeper coding units 2110, depths of coding units 2112 and 2154 are 1, depths of coding units 2114, 2116, 2118, 2128, 2150, and 2152 are 2, depths of coding units 2120, 2122, 2124, 2126, 2130, 2132, and 2148 are 3, and depths of coding units 2140, 2142, 2144, and 2146 are 4.

Some partitions 2114, 2116, 2122, 2132, 2148, 2150, 2152, and 2154 from among the prediction units 2160 are obtained by splitting the coding unit. That is, partitions 2114, 2122, 2150, and 2154 are a partition type having a size of 2N×N, partitions 2116, 2148, and 2152 are a partition type having a size of N×2N, and a partition 2132 is a partition type having a size of N×N. Prediction units and partitions of the deeper coding units 2110 are smaller than or equal to each coding unit.

Transformation or inverse transformation is performed on image data of the coding unit 2152 in the transformation units 2170 in a data unit that is smaller than the coding unit 2152. Also, the coding units 2114, 2116, 2122, 2132, 2148, 2150, 2152, and 2154 in the transformation units 2160 are data units different from those in the prediction units 2160 in terms of sizes and shapes. That is, the video encoding apparatus 1200 and the video decoding apparatus 1300 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may include split information about a coding unit, partition type information, prediction mode information, and transformation unit size information. Table 1 below shows the encoding information that may be set by the video encoding apparatus 1200 and the video decoding apparatus 1300 according to the embodiments.

TABLE 1

Split Information 0
(Encoding on Coding Unit having Size of 2N × 2N and Current Depth of d)

| Prediction Mode | Partition Type | | Size of Transformation Unit | | Split Information 1 |
|---|---|---|---|---|---|
| | Symmetrical Partition Type | Asymmetrical Partition Type | Split Information 0 of Transformation Unit | Split Information 1 of Transformation Unit | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Partition Type) N/2 × N/2 (Asymmetrical Partition Type) | Repeatedly Encode Coding Units having Lower Depth of d + 1 |

The output unit 1230 of the video encoding apparatus 1200 according to the embodiment may output the encoding information about the coding units having a tree structure, and the image data and encoding information extractor 1320 of the video decoding apparatus 1300 according to the embodiment may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is an encoding depth, and thus partition type information, prediction mode information, and transformation unit size information may be defined for the encoding depth. If the current coding unit has to be further split according to the split information, encoding has to be independently performed on each of four split coding units of a lower depth.

A prediction mode may be one of an intra mode, an inter mode, and a skip mode. The intra mode and the inter mode may be defined in all partition types, and the skip mode may be defined only in a partition type having a size of 2N×2N.

The partition type information may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure according to an embodiment may be assigned to at least one of a coding unit corresponding to an encoding depth, a prediction unit, and a minimum unit. The coding unit corresponding to the encoding depth may include at least one of a prediction unit and a minimum unit containing the same encoding information.

Accordingly, it is determined whether adjacent data units are included in the coding unit corresponding to the same encoding depth by comparing a plurality of pieces of encoding information of the adjacent data units. Also, a coding unit of a corresponding encoding depth is determined by using encoding information of a data unit, and thus a distribution of encoding depths in a largest coding unit may be inferred.

Accordingly, if a current coding unit is predicted based on adjacent data units, encoding information of data units in deeper coding units adjacent to the current coding unit may be directly referred to and used.

In another embodiment, if a current coding unit is prediction-encoded based on adjacent data units, the adjacent data units may be referred to in a manner that data adjacent to the current coding unit is searched for in deeper coding units by using encoding information of the deeper coding units adjacent to the current coding unit.

Figure 24:
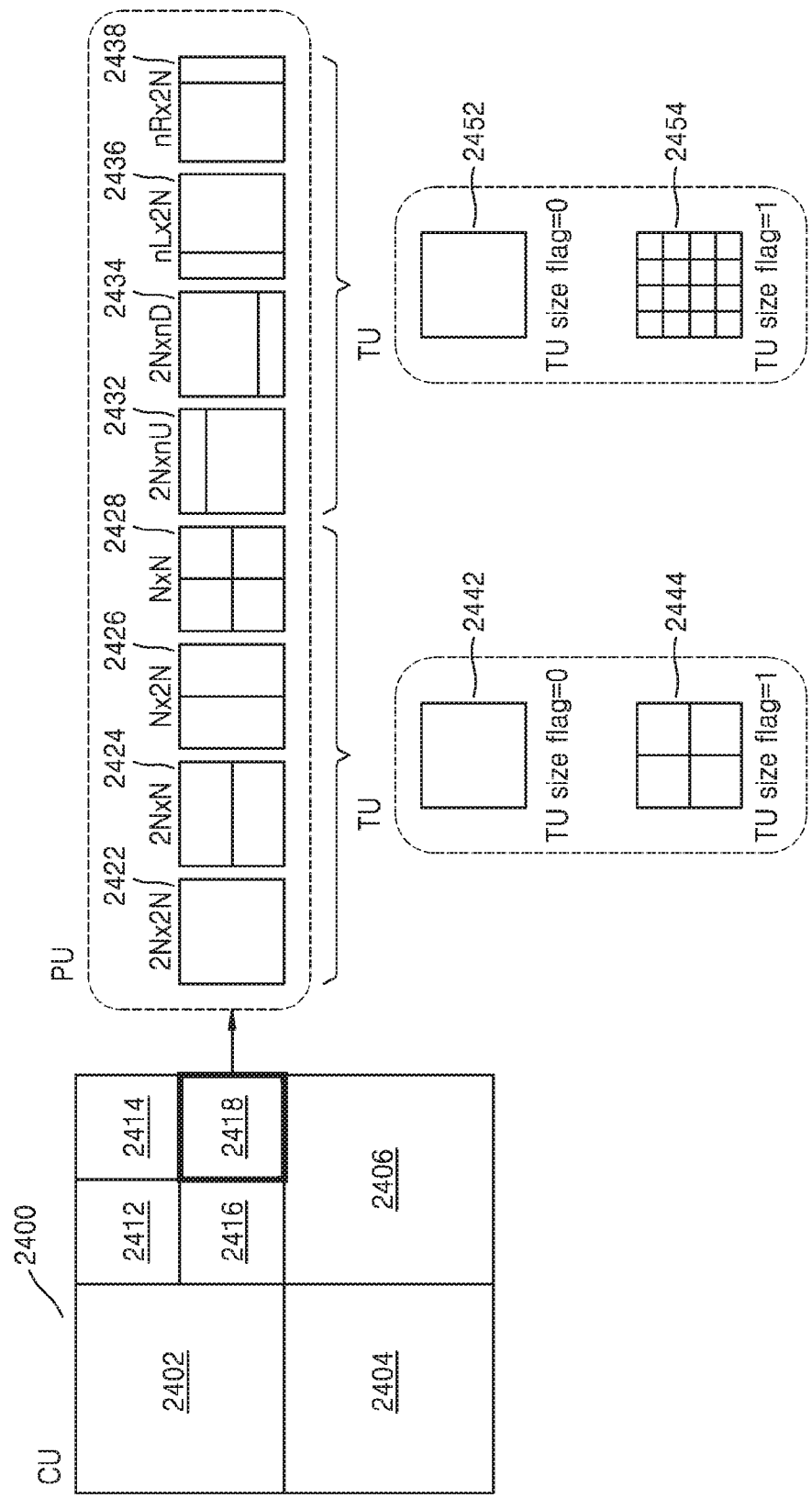
FIG. 24 illustrates a relationship between a coding unit, a prediction unit, and a transformation unit, according to encoding mode information of Table 1.

FIG. 24 illustrates a relationship between a coding unit, a prediction unit, and a transformation unit, according to encoding mode information of Table 1.

A largest coding unit 2400 includes coding units 2402, 2404, 2406, 2412, 2414, 2416, and 2418 of encoding depths. Here, because the coding unit 2418 is a coding unit of an encoding depth, split information may be set to 0. Partition type information of the coding unit 2418 having a size of 2N×2N may be set to be one of partition types including 2N×2N 2422, 2N×N 2424, N×2N 2426, N×N 2428, 2N×nU 2432, 2N×nD 2434, nL×2N 2436, and nR×2N 2438.

Transformation unit split information (TU size flag) is a type of a transformation index, and a size of a transformation unit corresponding to the transformation index may be changed according to a prediction unit type or partition type of the coding unit.

For example, when the partition type information is set to be one of symmetrical partition types 2N×2N 2422, 2N×N 2424, N×2N 2426, and N×N 2428, if the transformation unit split information is 0, a transformation unit 2442 having a size of 2N×2N is set, and if the transformation unit split information is 1, a transformation unit 2444 having a size of N×N may be set.

When the partition type information is set to be one of asymmetrical partition types 2N×nU 2432, 2N×nD 2434, nL×2N 2436, and nR×2N 2438, if the transformation unit split information (TU size flag) is 0, a transformation unit 2452 having a size of 2N×2N may be set, and if the transformation unit split information is 1, a transformation unit 2454 having a size of N/2×N/2 may be set.

The transformation unit split information (TU size flag) described above with reference to FIG. 24 is a flag having a value of 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 1200 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 1300 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (2):

$$\text{CurrMinTuSize} = \max(\text{MinTransformSize}, \text{RootTuSize}/(2^{\text{MaxTransformSizeIndex}})) \quad (2)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (2), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (3) below. In Equation (3), 'MaxTransformSize' denotes a maximum transformation unit size, and 'PUSize' denotes a current prediction unit size.

$$\text{RootTuSize} = \min(\text{MaxTransformSize}, \text{PUSize}) \quad (3)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (4) below. 'PartitionSize' denotes the size of the current partition unit.

$$\text{RootTuSize} = \min(\text{MaxTransformSize}, \text{PartitionSize}) \quad (4)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 12 through 24, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

Also, offset parameters may be signaled with respect to each picture, each slice, each largest coding unit, each of coding units of a tree structure, each prediction unit of the coding units, or each transformation unit of the coding units. For example, sample values of reconstructed pixels of each largest coding unit may be adjusted by using offset values reconstructed based on received offset parameters, and thus a largest coding unit having a minimum error between an original block and the largest coding unit may be reconstructed.

The embodiments of the present disclosure may be written as computer programs and may be implemented in general-use digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

In the present specification, at least some elements named "-er/or/unit" used herein may be embedded as hardware. In addition, the hardware may include a processor. The processor may be a general purpose single- or multi-chip microprocessor (e.g., an ARM), a special purpose microprocessor (e.g., a digital signal processor (DSP)), a microcontroller, a programmable gate array, etc. The processor may be referred to as a central processing unit (CPU). In at least some elements named with a suffix "-er/or/unit", a combination of processors (e.g., an ARM and DSP) may be used.

The hardware may also include a memory. The memory may be any electronic component capable of storing electronic information. The memory may be embodied as a random access memory (RAM), a read-only memory (ROM), a magnetic disk storage medium, an optical storage medium, a flash memory device in a RAM, an on-board memory included in the processor, an EPROM memory, an EEPROM memory, registers, or the like, including combinations thereof.

Data and programs may be stored in the memory. The programs may be executable by the processor to implement the methods disclosed in the present disclosure. Executing the programs may involve the use of the data stored in the memory. When the processor executes instructions, various portions of the instructions may be loaded onto the processor, and various pieces of data may be loaded onto the processor.

While this disclosure has been particularly shown and described with reference to embodiments thereof, it will be understood by those of ordinary skill in the art that various changes in form and details may be made therein without departing from the spirit and scope of the disclosure. The embodiments should be considered in a descriptive sense only and not for purposes of limitation. The scope of the disclosure is defined not by the detailed description of the disclosure but by the appended claims, and all differences within the scope will be construed as being included in the present disclosure.

The invention claimed is:

1. An image decoding method comprising:
parsing offset values and an offset type from a bitstream;
parsing a class based on the offset type from the bitstream;
selecting a plurality of pixels from among pixels adjacent to a reconstructed pixel, based on the class, and calculating a reference value based on sample values of the plurality of pixels;
determining a category based on a magnitude of a difference value between the reference value and a sample value of the reconstructed pixel;
selecting an offset value from among the offset values, the offset value corresponding to the category; and
compensating for the sample value of the reconstructed pixel by using the selected offset values,
wherein, in the calculating of the reference value,
if the offset type is a median value type, the reference value corresponds to a median value of the sample values of the plurality of pixels, and
if the offset type is a mean value type, the reference value corresponds to a mean value of the sample values of the plurality of pixels.

2. The image decoding method of claim 1, wherein the calculating of the reference value comprises calculating one of a median value and a mean value of the sample values of the plurality of pixels.

3. The image decoding method of claim 1, wherein, if the offset type is an edge type, the calculating of the reference value comprises determining, based on the class, the reference value to be one of a median value and a mean value of the sample values of the plurality of pixels.

4. A non-transitory computer-readable recording medium having recorded thereon a program for implementing the image decoding method of claim 1.

5. The image decoding method of claim 1, wherein the category is one of a plurality of categories classified based on the magnitude of the difference value.

6. The image decoding method of claim 5,
wherein, in the determining of the category,
if the difference value is less than a first threshold value, the category is determined as a first category,
if the difference value is equal to or greater than the first threshold value and is less than a second threshold value, the category is determined as a second category,
if the difference value is equal to or greater than the second threshold value and is less than a third threshold value, the category is determined as a third category,
if the difference value is equal to or greater than the third threshold value and is less than a fourth threshold value, the category is determined as a fourth category, and
if the difference value is equal to or greater than the fourth threshold value, the category is determined as a fifth category, and
wherein the plurality of categories comprise the first through fifth categories.

7. The image decoding method of claim 6, wherein the first threshold value and the second threshold value are negative numbers, and the third threshold value and the fourth threshold value are positive numbers.

8. The image decoding method of claim 7, wherein, if the category is determined as the third category, the sample value of the reconstructed pixel is not compensated for.

9. The image decoding method of claim 6, wherein the selecting of the offset value comprises selecting an offset value that corresponds to one of the first through fifth categories and is from among the offset values.

10. The image decoding method of claim 1, wherein
in the parsing of the offset values and the offset type, the offset values and the offset type are parsed according to each largest coding unit, and
the each largest coding unit comprises the reconstructed pixel.

11. The image decoding method of claim 1, wherein positions of the plurality of pixels have directions.

12. The image decoding method of claim 1, wherein the calculating of the reference value comprises calculating the reference value by using the sample value of the reconstructed pixel and the sample values of the plurality of pixels.

13. The image decoding method of claim 1, wherein the plurality of pixels comprise the reconstructed pixel, and an upper left pixel, a left pixel, a right pixel, and a lower right pixel which are relative to the reconstructed pixel.

14. The image decoding method of claim 1, wherein the plurality of pixels comprise the reconstructed pixel, and a lower left pixel, a left pixel, a right pixel, and an upper right pixel which are relative to the reconstructed pixel.

15. The image decoding method of claim 1, wherein the plurality of pixels comprise the reconstructed pixel, and an upper left pixel, an upper pixel, a lower pixel, and a lower right pixel which are relative to the reconstructed pixel.

16. The image decoding method of claim 1, wherein the plurality of pixels comprise the reconstructed pixel, and a lower left pixel, a lower pixel, an upper pixel, and an upper right pixel which are relative to the reconstructed pixel.

17. An image decoding apparatus comprising:
at least one processor configured to parse offset values and an offset type from a bitstream, and to parse a class based on the offset type from the bitstream;
select a plurality of pixels from among pixels adjacent to a reconstructed pixel, based on the class, to calculate a reference value based on sample values of the plurality of pixels, to determine a category based on a magnitude of a difference value between the reference value and a sample value of the reconstructed pixel, and to select an offset value from among the offset values, the offset value corresponding to the category; and
compensate for the sample value of the reconstructed pixel by using the selected offset value,
wherein, in the calculating of the reference value,
if the offset type is a median value type, the reference value corresponds to a median value of the sample values of the plurality of pixels, and
if the offset type is a mean value type, the reference value corresponds to a mean value of the sample values of the plurality of pixels.

18. An image encoding method comprising:
selecting a plurality of pixels from among pixels adjacent to a reconstructed pixel, based on a class from among a plurality of classes according to an offset type, and calculating a reference value based on sample values of the plurality of pixels;
determining a category based on a magnitude of a difference value between the reference value and a sample value of the reconstructed pixel;
determining an offset value corresponding to the category, based on the sample value of the reconstructed pixel and a sample value of an original pixel of the reconstructed pixel;

encoding the offset value, the offset type, and the class; and transmitting a bitstream comprising the encoded offset value, the encoded offset type, and the encoded class, wherein, in the calculating of the reference value, if the offset type is a median value type, the reference value corresponds to a median value of the sample values of the plurality of pixels, and if the offset type is a mean value type, the reference value corresponds to a mean value of the sample values of the plurality of pixels.

19. An image encoding apparatus comprising:

at least one processor configured to select a plurality of pixels from among pixels adjacent to a reconstructed pixel, based on a class from among a plurality of classes according to an offset type, to calculate a reference value based on sample values of the plurality of pixels, to determine a category based on a magnitude of a difference value between the reference value and a sample value of the reconstructed pixel, to determine an offset value corresponding to the category, based on the sample value of the reconstructed pixel and a sample value of an original pixel of the reconstructed pixel, and to encode the offset value, the offset type, and the class; and transmit a bitstream comprising the encoded offset value, the encoded offset type, and the encoded class, wherein, in the calculating of the reference value, if the offset type is a median value type, the reference value corresponds to a median value of the sample values of the plurality of pixels, and if the offset type is a mean value type, the reference value corresponds to a mean value of the sample values of the plurality of pixels.

* * * * *